United States Patent
Huang

(10) Patent No.: US 10,598,904 B2
(45) Date of Patent: Mar. 24, 2020

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/282,434

(22) Filed: Feb. 22, 2019

(65) Prior Publication Data

US 2019/0187440 A1 Jun. 20, 2019

Related U.S. Application Data

(63) Continuation of application No. 15/822,582, filed on Nov. 27, 2017, now Pat. No. 10,254,513, which is a (Continued)

(30) Foreign Application Priority Data

Dec. 30, 2014 (TW) .............................. 103146323 A

(51) Int. Cl.
*G02B 13/00* (2006.01)
*H04N 5/225* (2006.01)

(52) U.S. Cl.
CPC ....... *G02B 13/0045* (2013.01); *H04N 5/2254* (2013.01)

(58) Field of Classification Search
CPC ...... H04N 5/2254; H04N 5/2253; G02B 3/00; G02B 3/02; G02B 3/08; G02B 3/06;
(Continued)

(56) References Cited

U.S. PATENT DOCUMENTS 2,319,171 A 5/1943 Warmisham
2,413,476 A 12/1946 Warmisham
(Continued)

FOREIGN PATENT DOCUMENTS

CN 101520544 A 9/2009
CN 201974571 U 9/2011
(Continued)

*Primary Examiner* — William R Alexander
*Assistant Examiner* — Henry A Duong
(74) *Attorney, Agent, or Firm* — McClure, Qualey & Rodack, LLP

(57) ABSTRACT

An imaging optical lens assembly includes, in order from an object side to an image side, a first lens element, a second lens element, a third lens element, a fourth lens element, a fifth lens element and a sixth lens element. The first lens element with positive refractive power has a convex object-side surface. The second lens element has negative refractive power. The third lens element with refractive power has both an object-side surface and an image-side surface being aspheric. The fourth lens element with refractive power has both an object-side surface and an image-side surface being aspheric. The fifth lens element with refractive power has both an object-side surface and an image-side surface being aspheric. The sixth lens element with refractive power has both an object-side surface and an image-side surface being aspheric.

32 Claims, 24 Drawing Sheets

Related U.S. Application Data continuation of application No. 14/684,516, filed on Apr. 13, 2015, now Pat. No. 9,857,559.

(58) Field of Classification Search
CPC ... G02B 3/04; G02B 9/02; G02B 9/04; G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/62; G02B 9/64; G02B 9/00–64; G02B 13/00; G02B 13/0045; G02B 13/02; G02B 13/04; G02B 13/002–0045; G02B 13/18; G02B 13/005; G02B 15/00–28
USPC .......... 359/676–695, 745–795, 708–718
See application file for complete search history.

(56) References Cited

U.S. PATENT DOCUMENTS

| | | | |
|---|---|---|---|
| 2,983,194 A | 5/1961 | Miles | |
| 4,060,312 A | 11/1977 | Linke et al. | |
| 4,632,520 A | 12/1986 | Yamakawa | |
| 5,642,229 A | 6/1997 | Kaneko et al. | |
| 5,691,851 A | 11/1997 | Nishio et al. | |
| 6,014,265 A | 1/2000 | Kato et al. | |
| 6,028,716 A | 2/2000 | Kato et al. | |
| 6,236,517 B1 | 5/2001 | Kato et al. | |
| 6,411,443 B1 | 6/2002 | Kato et al. | |
| 8,335,043 B2 | 12/2012 | Huang | |
| 8,432,619 B2 | 4/2013 | Huang | |
| 2012/0314301 A1 | 12/2012 | Huang et al. | |
| 2014/0098239 A1 | 4/2014 | Jeong | |
| 2014/0153117 A1 | 6/2014 | Hagiwara | |
| 2014/0204480 A1 | 7/2014 | Jo et al. | |
| 2015/0085378 A1 | 3/2015 | Jung et al. | |
| 2015/0247989 A1 | 9/2015 | Sakai | |
| 2016/0004047 A1 | 1/2016 | Iwasaki et al. | |
| 2016/0004050 A1* | 1/2016 | Tang | G02B 13/0045 348/374 |
| 2016/0018629 A1* | 1/2016 | Tang | G02B 13/0045 348/373 |
| 2016/0041370 A1 | 2/2016 | Lee et al. | |
| 2016/0103300 A1* | 4/2016 | Tang | G02B 27/0025 348/335 |
| 2016/0109688 A1* | 4/2016 | Jo | G02B 13/0045 348/373 |
| 2016/0124192 A1 | 5/2016 | Koreeda | |
| 2016/0131871 A1* | 5/2016 | Tang | G02B 13/0045 359/713 |
| 2016/0131873 A1 | 5/2016 | Tang et al. | |
| 2016/0139368 A1 | 5/2016 | You | |
| 2016/0170182 A1 | 6/2016 | Tanaka | |

FOREIGN PATENT DOCUMENTS

| | | |
|---|---|---|
| CN | 202049277 U | 11/2011 |
| CN | 102681148 A | 9/2012 |
| CN | 205281004 U | 6/2016 |
| JP | S5833211 A | 2/1983 |
| JP | S5846312 A | 3/1983 |
| JP | S5983121 A | 5/1984 |
| JP | S6167814 A | 4/1986 |
| JP | H0259735 A | 2/1990 |
| JP | H06230277 A | 8/1994 |
| JP | 07-077656 A | 3/1995 |
| JP | H0763987 A | 3/1995 |
| JP | 07-151974 A | 6/1995 |
| JP | H08101339 A | 4/1996 |
| JP | H10221597 A | 8/1998 |
| JP | H10221601 A | 8/1998 |
| JP | 11-023970 A | 1/1999 |
| JP | 11-119098 A | 4/1999 |
| JP | 11-119102 A | 4/1999 |
| JP | 2014-010399 A | 1/2014 |
| JP | 2014-010401 A | 1/2014 |
| JP | 2016090777 A | 5/2016 |
| JP | 2016114803 A | 6/2016 |
| KR | 10-2010-0040357 A | 4/2010 |
| WO | 2012-169778 | 12/2012 |
| WO | 2014155468 A1 | 10/2014 |
| WO | 2014175058 A1 | 10/2014 |

* cited by examiner

IMAGING OPTICAL LENS ASSEMBLY, IMAGING APPARATUS AND ELECTRONIC DEVICE

RELATED APPLICATIONS

The present application is a continuation of the application Ser. No. 15/822,582, filed Nov. 27, 2017, which is a continuation of the application Ser. No. 14/684,516, filed Apr. 13, 2015, U.S. Pat. No. 9,857,559 issued on Jan. 2, 2018, which claims priority to Taiwan Application Serial Number 103146323, filed Dec. 30, 2014, which is herein incorporated by reference.

BACKGROUND

Technical Field

The present disclosure relates to an imaging optical lens assembly and an imaging apparatus. More particularly, the present disclosure relates to a compact imaging optical lens assembly and an imaging apparatus which is applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

Conventional constructions of telephoto optical systems are mainly equipped with multiple spherical glass lens elements. The lens size of these systems becomes too large to carry, and the costs of manufacturing these systems become too high. Hence, the conventional optical systems cannot satisfy these photographic requirements of convenience and multi-functions.

SUMMARY

According to one aspect of the present disclosure, an imaging optical lens assembly includes, in order from an object side to an image side, a first lens element, a second lens element, a third lens element, a fourth lens element, a fifth lens element and a sixth lens element. The first lens element with positive refractive power has a convex object-side surface. The second lens element has negative refractive power. The third lens element with refractive power has both an object-side surface and an image-side surface being aspheric. The fourth lens element with refractive power has both an object-side surface and an image-side surface being aspheric. The fifth lens element with refractive power has both an object-side surface and an image-side surface being aspheric. The sixth lens element with refractive power has both an object-side surface and an image-side surface being aspheric. The imaging optical lens assembly has a total of six lens elements with refractive power. There is an air gap between any two of the first lens element, the second lens element, the third lens element, the fourth lens element, the fifth lens element and the sixth lens element that are adjacent to each other. There is no relative movement among the lens elements with refractive power thereof. The imaging optical lens assembly further comprises an aperture stop with no lens element having refractive power between the aperture stop and the first lens element. When a focal length of the imaging optical lens assembly is f, a maximum image height of the imaging optical lens assembly is ImgH, a sum of central thicknesses of the first lens element, the second lens element, the third lens element, the fourth lens element, the fifth lens element and the sixth lens element is $\Sigma CT$, a sum of axial distances between every two of the first lens element, the second lens element, the third lens element, the fourth lens element, the fifth lens element and the sixth lens element that are adjacent to each other is $\Sigma AT$, and an axial distance between the aperture stop and the image-side surface of the sixth lens element is SD, the following conditions are satisfied:

$2.0 < f/\text{ImgH}$;

$0.90 < (\Sigma CT + \Sigma AT)/SD < 1.30$; and $1.55 < (\Sigma CT + \Sigma AT)/\Sigma CT$.

According to another aspect of the present disclosure, an imaging apparatus includes the imaging optical lens assembly according to the aforementioned aspect and an image sensor, wherein the image sensor is disposed on an image surface of the imaging optical lens assembly.

According to still another aspect of the present disclosure, an electronic device includes the imaging apparatus according to the foregoing aspect.

According to yet another aspect of the present disclosure, an imaging optical lens assembly includes, in order from an object side to an image side, a first lens element, a second lens element, a third lens element, a fourth lens element, a fifth lens element and a sixth lens element. The first lens element with positive refractive power has a convex object-side surface. The second lens element has negative refractive power. The third lens element with refractive power has both an object-side surface and an image-side surface being aspheric. The fourth lens element with refractive power has both an object-side surface and an image-side surface being aspheric. The fifth lens element with refractive power has both an object-side surface and an image-side surface being aspheric. The sixth lens element with refractive power has both an object-side surface and an image-side surface being aspheric. The imaging optical lens assembly has a total of six lens elements with refractive power. There is an air gap between any two of the first lens element, the second lens element, the third lens element, the fourth lens element, the fifth lens element and the sixth lens element that are adjacent to each other. There is no relative movement among the lens elements with refractive power thereof. The imaging optical lens assembly further comprises an aperture stop with no lens element having refractive power between the aperture stop and an object. When a focal length of the imaging optical lens assembly is f, a maximum image height of the imaging optical lens assembly is ImgH, a sum of central thicknesses of the first lens element, the second lens element, the third lens element, the fourth lens element, the fifth lens element and the sixth lens element is $\Sigma CT$, a sum of axial distances between every two of the first lens element, the second lens element, the third lens element, the fourth lens element, the fifth lens element and the sixth lens element that are adjacent to each other is $\Sigma AT$, and an axial distance between the aperture stop and the image-side surface of the sixth lens element is SD, the following conditions are satisfied:

$2.0 < f/\text{ImgH}$; and $0.90 < (\Sigma CT + \Sigma AT)/SD < 1.20$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
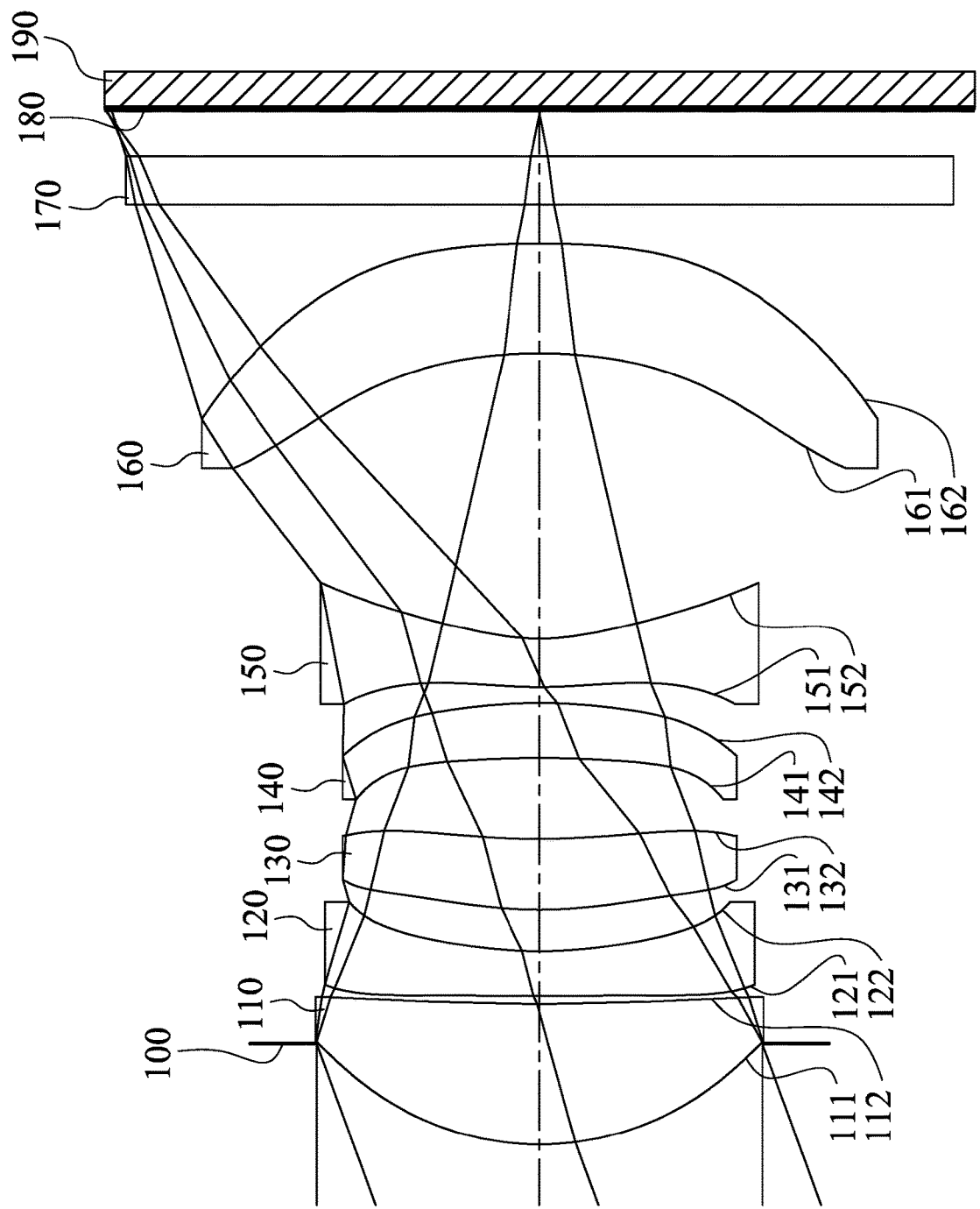
FIG. 1 is a schematic view of an imaging apparatus according to the 1st embodiment of the present disclosure.

An imaging optical lens assembly includes, in order from an object side to an image side, a first lens element, a second lens element, a third lens element, a fourth lens element, a fifth lens element and a sixth lens element. The imaging optical lens assembly has a total of six lens elements with refractive power.

According to the imaging optical lens assembly of the present disclosure, there is an air gap between any two of the first lens element, the second lens element, the third lens element, the fourth lens element, the fifth lens element and the sixth lens element that are adjacent to each other, that is, each of the first through sixth lens elements of the imaging optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the imaging optical lens assembly. Therefore, there is an air gap between any two of the first lens element, the second lens element, the third lens element, the fourth lens element, the fifth lens element and the sixth lens element that are adjacent to each other in the present disclosure for resolving the problem generated by the cemented lens elements.

There is no relative movement among the lens elements with refractive power of the imaging optical lens assembly. Therefore, it is favorable for reducing the misalignment with the optical axis of each lens element caused by the relative movement among the lens elements.

The first lens element with positive refractive power has a convex object-side surface and can have a concave image-side surface. Therefore, it is favorable for having the light gathering of the imaging optical lens assembly on the object side so as to reduce a back focal length, maintain the compact size and reduce the astigmatism.

The second lens element with negative refractive power can have a concave image-side surface. Therefore, it is favorable for adjusting the light path of different bands so as to further focus the image point and correct the aberration of the imaging optical lens assembly.

The third lens element can have positive refractive power and have a concave image-side surface. Therefore, it is favorable for effectively reducing the sensitivity of refractive power distribution.

The fourth lens element can have positive refractive power, and can have a concave object-side surface and a convex image-side surface. Therefore, it is favorable for effectively correcting the astigmatism and reducing the sensitivity of refractive power distribution.

The fifth lens element can have negative refractive power and have a concave image-side surface. Therefore, it is favorable for effectively correcting the astigmatism. Furthermore, the fifth lens element can have an object-side surface changing from a convex shape to a concave shape from a paraxial region thereof to an off-axis region thereof. Therefore, it is favorable for effectively correcting the off-axis aberration.

The sixth lens element can have negative refractive power, and can have a concave object-side surface and a convex image-side surface. Therefore, the principal point of the imaging optical lens assembly can be positioned away from the image surface, and the back focal length can be reduced so as to maintain the compact size of the imaging optical lens assembly.

Furthermore, at least one surface of at least one of the fifth lens element and the sixth lens element has at least one inflection point. Therefore, it is favorable for effectively reducing the incident angle of off-axis so as to correct the off-axis aberration.

The imaging optical lens assembly further includes a stop, such as an aperture stop, and there is no lens element with refractive power between the stop and the first lens element. Thus, the stop can be disposed between the object and the first lens element, or between the first lens element and the second lens element. Therefore, it is favorable for obtaining a longer distance between an exit pupil of the imaging optical lens assembly and the image surface so as to enhance the telecentric effect and improve the image-sensing efficiency of an image sensor.

When a focal length of the imaging optical lens assembly is f, and a maximum image height of the imaging optical lens assembly is ImgH, the following condition is satisfied: $2.0<\text{f}/\text{ImgH}$. Therefore, it is favorable for enhancing the image capturing ability on a far specific region and obtaining the high resolution image while focusing on the far specific region.

When a sum of central thicknesses of the first lens element, the second lens element, the third lens element, the fourth lens element, the fifth lens element and the sixth lens element is ΣCT, a sum of axial distances between every two of the first lens element, the second lens element, the third lens element, the fourth lens element, the fifth lens element and the sixth lens element that are adjacent to each other is ΣAT, and an axial distance between the stop and the image-side surface of the sixth lens element is SD, the following condition is satisfied: $0.90<(\Sigma\text{CT}+\Sigma\text{AT})/\text{SD}<1.30$. Therefore, it is favorable for balancing the telephoto image quality and the space arrangement. Preferably, the following condition is satisfied: $0.90<(\Sigma\text{CT}+\Sigma\text{AT})/\text{SD}<1.20$.

When the sum of central thicknesses of the first lens element, the second lens element, the third lens element, the fourth lens element, the fifth lens element and the sixth lens element is ΣCT, and the sum of axial distances between every two of the first lens element, the second lens element, the third lens element, the fourth lens element, the fifth lens element and the sixth lens element that are adjacent to each other is ΣAT, the following condition is satisfied: $1.55<(\Sigma\text{CT}+\Sigma\text{AT})/\Sigma\text{CT}$. Therefore, it is favorable for assembling the lens elements and maintaining the compact size of the imaging optical lens assembly.

When an axial distance between the object-side surface of the first lens element and the image surface is TL, and the focal length of the imaging optical lens assembly is f, the following condition is satisfied: $0.50<\text{TL}/\text{f}<1.15$. Therefore, it is favorable for maintaining the compact size of the imaging optical lens assembly. Preferably, the following condition is satisfied: $0.70<\text{TL}/\text{f}<1.05$. More preferably, the following condition is satisfied: $0.70<\text{TL}/\text{f}<1.0$.

When an Abbe number of the fourth lens element is V4, the following condition is satisfied: $\text{V4}<30$. Therefore, it is favorable for correcting the chromatic aberration of the imaging optical lens assembly.

When the focal length of the imaging optical lens assembly is f, and a curvature radius of the object-side surface of the first lens element is R1, the following condition is satisfied: $3.0<\text{f}/\text{R1}$. Therefore, it is favorable for strengthening refractive power of the object side of the imaging optical lens assembly so as to enhance the resolution and details of a distant image.

When an axial distance between the fifth lens element and the sixth lens element is T56, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and a maximum value among CT1, CT2, CT3, CT4, CT5 and CT6 is CTmax, the following condition is satisfied: $0.70<\text{T56}/\text{CTmax}$. Therefore, it is favorable for properly adjusting the axial distance and central thicknesses of the lens elements so as to obtain sufficient space for adjusting light beams and correct the high-order aberration and image bending.

When a half of a maximal field of view of the imaging optical lens assembly is HFOV, the following condition is satisfied: $7.5 \text{ degrees}<\text{HFOV}<23.5 \text{ degrees}$. Therefore, it is favorable for obtaining a proper field of view and an imaging scene.

When a distance in parallel with an optical axis from an axial vertex on the image-side surface of the sixth lens element to a maximum effective radius position on the image-side surface of the sixth lens element is SAG62, and the central thickness of the sixth lens element is CT6, the following condition is satisfied: $\text{SAG62}+\text{CT6}<0$ mm. Therefore, it is favorable for effectively controlling the incident angle of off-axis onto the image surface so as to improve the photosensitivity of the image sensor and reduce the image vignetting.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, and a maximum value among N1, N2, N3, N4, N5 and N6 is Nmax, the following condition is satisfied: $\text{Nmax}<1.70$. Therefore, it is favorable for correcting the aberration.

When the axial distance between the object-side surface of the first lens element and the image surface is TL, and the maximum image height of the imaging optical lens assembly is ImgH, the following condition is satisfied: $2.0<\text{TL}/\text{ImgH}<3.0$. Therefore, it is favorable for controlling the field of view and effectively reducing the total track length of the imaging optical lens assembly so as to maintain the compact size thereof.

When the central thickness of the sixth lens element is CT6, and an axial distance between the first lens element and the second lens element is T12, the following condition is satisfied: $2<\text{CT6}/\text{T12}<30$. Therefore, it is favorable for manufacturing and assembling the lens elements so as to increase the manufacturing yield rate.

When an Abbe number of the first lens element is V1, an Abbe number of the second lens element is V2, an Abbe number of the third lens element is V3, the Abbe number of the fourth lens element is V4, an Abbe number of the fifth lens element is V5, and an Abbe number of the sixth lens element is V6, at least two of V1, V2, V3, V4, V5 and V6 are smaller than 27. Therefore, it is favorable for correcting the chromatic aberration of the imaging optical lens assembly and maintaining the image quality.

When a composite focal length of the first lens element and the second lens element is f12, and a composite focal length of the third lens element, the fourth lens element, the fifth lens element and the sixth lens element is f3456, the following condition is satisfied: $\text{f12}/\text{f3456}<0.30$. Therefore, it is favorable for properly distributing refractive power of the object side and image side of the imaging optical lens assembly so as to satisfy the requirements of the resolution of telephoto and the compact size thereof.

When a maximum effective radius of the object-side surface of the first lens element is Y11, and a maximum effective radius of the image-side surface of the sixth lens element is Y62, the following condition is satisfied: 0.50<Y11/Y62<0.80. Therefore, it is favorable for reducing the total track length of the imaging optical lens assembly and obtaining the efficient exposure so as to improve the image quality.

When the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the axial distance between the fifth lens element and the sixth lens element is T56, the following conditions are satisfied: 0<T12<T23<T56; 0<T12<T34<T56; 0<T45<T23<T56; and 0<T45<T34<T56. Therefore, it is favorable for arranging the lens elements so as to improve the manufacturing efficiency.

According to the imaging optical lens assembly of the present disclosure, the lens elements thereof can be made of plastic or glass material. When the lens elements are made of plastic material, the manufacturing cost can be effectively reduced. When the lens elements are made of glass material, the arrangement of the refractive power of the imaging optical lens assembly may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging optical lens assembly can also be reduced.

According to the imaging optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Furthermore, when the lens element has positive refractive power or negative refractive power, it indicates that the lens element has refractive power in the paraxial region thereof. When the lens element has a focal length, it indicates that the lens element has a focal length in the paraxial region thereof.

According to the imaging optical lens assembly of the present disclosure, the image surface, depending on the corresponding image sensor, can be a plane surface or a curved surface with any curvature. When the image surface is a curved surface, it is particularly indicates a concave surface toward the object side.

According to the imaging optical lens assembly of the present disclosure, an aperture stop can be configured as a front stop or a middle stop. A front stop disposed between an imaged object and the first lens element can provide a longer distance between an exit pupil of the imaging optical lens assembly and the image surface and thereby improves the image-sensing efficiency of an image sensor. A middle stop disposed between the first lens element and the image surface is favorable for enlarging the field of view of the imaging optical lens assembly and thereby provides a wider field of view for the same.

According to the imaging optical lens assembly of the present disclosure, the imaging optical lens assembly can include at least one stop, such as an aperture stop, a glare stop or a field stop. The glare stop or the field stop is for eliminating the stray light and thereby improving the image resolution thereof.

According to the imaging optical lens assembly of the present disclosure, the imaging optical lens assembly is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an imaging apparatus is provided. The imaging apparatus includes the aforementioned imaging optical lens assembly according to the present disclosure and an image sensor, wherein the image sensor is disposed on or near an image surface of the aforementioned imaging optical lens assembly. In the imaging optical lens assembly of the imaging apparatus, it is favorable for properly adjusting the distribution of refractive power of the first lens element and the second lens element so as to prevent having excessively large size of the imaging optical lens assembly and provide a better focus of the telephoto image. Moreover, it is favorable for arranging the stop and the first lens element so as to increase the distance between an exit pupil of the imaging optical lens assembly and the image surface, thereby enhancing the telecentric effect and the image-sensing efficiency of the image sensor. Preferably, the imaging apparatus can further include a barrel member, a holder member or a combination thereof.

According to the present disclosure, an electronic device is provided, wherein the electronic device includes the aforementioned imaging apparatus. Therefore, it is favorable for telephoto shooting, arrangement of the lens elements and designs of the surface shapes so as to satisfy the requirements of resolution of telephoto and the compact size thereof. Preferably, the electronic device can further include but not limited to a control unit, a display, a storage unit, a random access memory unit (RAM) or a combination thereof.

According to the above description of the present disclosure, the following 1st-13th specific embodiments are provided for further explanation.

1st Embodiment

Figure 2:
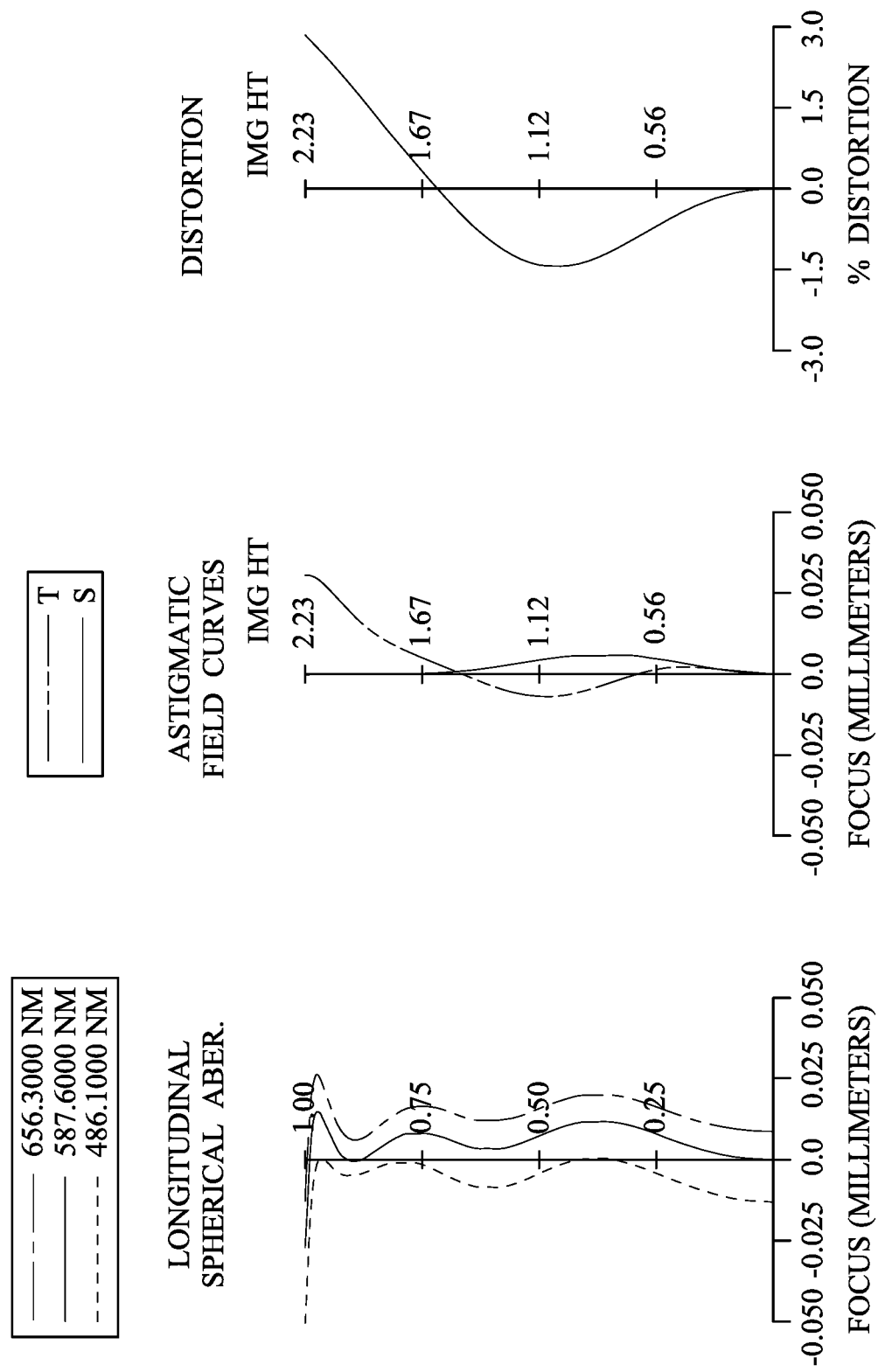
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows, in order from left to right, spherical aberration curves, astigmatic field curves and a distortion curve of the imaging apparatus according to the 1st embodiment.

In FIG. 1, the imaging apparatus includes the imaging optical lens assembly (its reference numeral is omitted) and an image sensor 190. The imaging optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180. The image sensor 190 is disposed on the image surface 180 of the imaging optical lens assembly. The imaging optical lens assembly has a total of six lens elements (110-160) with refractive power. Moreover, there is an air gap between any two of the first lens element 110, the second lens element 120, the third lens element 130, the fourth lens element 140, the fifth lens element 150, and the sixth lens element 160 that are adjacent to each other and there is no relative movement among the lens elements (110-160) with refractive power.

The first lens element 110 with positive refractive power has a convex object-side surface 111 and a concave image-side surface 112. The first lens element 110 is made of plastic material and has both the object-side surface 111 and the image-side surface 112 being aspheric.

The second lens element 120 with negative refractive power has a convex object-side surface 121 and a concave image-side surface 122. The second lens element 120 is made of plastic material and has both the object-side surface 121 and the image-side surface 122 being aspheric.

The third lens element 130 with positive refractive power has a convex object-side surface 131 and a concave image-side surface 132. The third lens element 130 is made of plastic material and has both the object-side surface 131 and the image-side surface 132 being aspheric.

The fourth lens element 140 with positive refractive power has a concave object-side surface 141 and a convex image-side surface 142. The fourth lens element 140 is made of plastic material and has both the object-side surface 141 and the image-side surface 142 being aspheric.

The fifth lens element 150 with negative refractive power has a convex object-side surface 151 and a concave image-side surface 152. The fifth lens element 150 is made of plastic material and has both the object-side surface 151 and the image-side surface 152 being aspheric. Furthermore, the object-side surface 151 of the fifth lens element 150 has at least one inflection point. The object-side surface 151 of the fifth lens element 150 changes from a convex shape to a concave shape from a paraxial region thereof to an off-axis region thereof.

The sixth lens element 160 with negative refractive power has a concave object-side surface 161 and a convex image-side surface 162. The sixth lens element 160 is made of plastic material and has both the object-side surface 161 and the image-side surface 162 being aspheric. Furthermore, the object-side surface 161 of the sixth lens element 160 has at least one inflection point.

The IR-cut filter 170 is made of glass material and located between the sixth lens element 160 and the image surface 180, and will not affect the focal length of the imaging optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens assembly of the imaging apparatus according to the 1st embodiment, when a focal length of the imaging optical lens assembly is f, an f-number of the imaging optical lens assembly is Fno, and half of a maximal field of view of the imaging optical lens assembly is HFOV, these parameters have the following values: f=5.96 mm; Fno=2.60; and HFOV=20.0 degrees.

In the imaging optical lens assembly of the imaging apparatus according to the 1st embodiment, when an Abbe number of the fourth lens element 140 is V4, the following condition is satisfied: V4=23.3.

In the imaging optical lens assembly of the imaging apparatus according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a maximum value among N1, N2, N3, N4, N5 and N6 is Nmax, the following condition is satisfied: Nmax=1.640.

In the imaging optical lens assembly of the imaging apparatus according to the 1st embodiment, when a central thickness of the sixth lens element 160 is CT6, and an axial distance between the first lens element 110 and the second lens element 120 is T12, the following condition is satisfied: CT6/T12=14.10.

In the imaging optical lens assembly of the imaging apparatus according to the 1st embodiment, when an axial distance between the fifth lens element 150 and the sixth lens element 160 is T56, a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, the central thickness of the sixth lens element 160 is CT6, and a maximum value among CT1, CT2, CT3, CT4, CT5 and CT6 is CTmax, the following condition is satisfied: T56/CTmax=2.03.

In the imaging optical lens assembly of the imaging apparatus according to the 1st embodiment, when the focal length of the imaging optical lens assembly is f, and a curvature radius of the object-side surface 111 of the first lens element 110 is R1, the following condition is satisfied: f/R1=4.05.

In the imaging optical lens assembly of the imaging apparatus according to the 1st embodiment, when the focal length of the imaging optical lens assembly is f, and a maximum image height of the imaging optical lens Jo assembly is ImgH (half of a diagonal length of an effective photosensitive area of the image sensor 190), the following conditions is satisfied: f/ImgH=2.67.

In the imaging optical lens assembly of the imaging apparatus according to the 1st embodiment, when a composite focal length of the first lens element 110 and the second lens element 120 is f12, and a composite focal length of the third lens element 130, the fourth lens element 140, the fifth lens element 150 and the sixth lens element 160 is f3456, the following condition is satisfied: f12/f3456=−0.41.

In the imaging optical lens assembly of the imaging apparatus according to the 1st embodiment, when a maximum effective radius of the object-side surface 111 of the first lens element 110 is Y11, and a maximum effective radius of the image-side surface 162 of the sixth lens element 160 is Y62, the following condition is satisfied: Y11/Y62=0.66.

Figure 21:
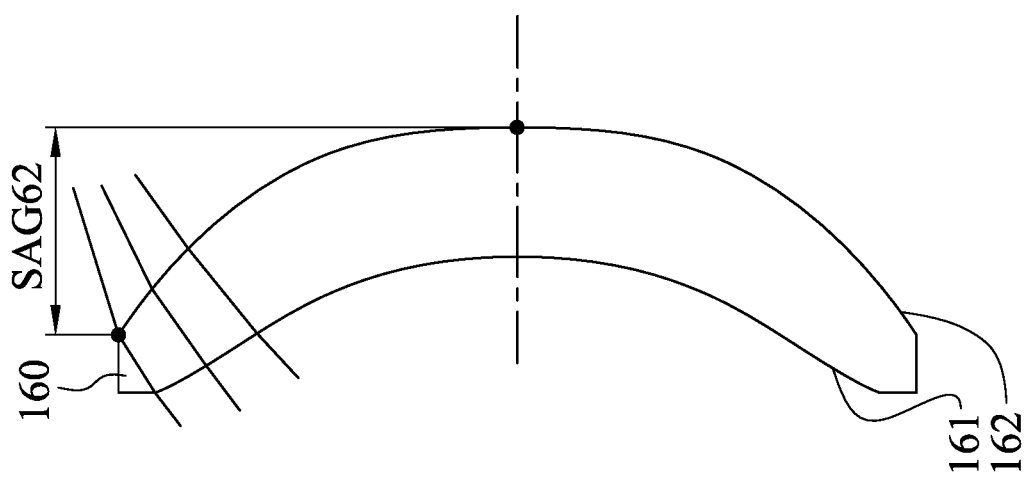
FIG. 21 shows a schematic view of the parameter SAG62 of the imaging optical lens assembly of the imaging apparatus according to FIG. 1.

FIG. 21 shows a schematic view of the parameter SAG62 of the imaging optical lens assembly of the imaging apparatus according to FIG. 1. In FIG. 21, when a distance in parallel with the optical axis from an axial vertex on the image-side surface 162 of the sixth lens element 160 to a maximum effective radius position on the image-side surface 162 of the sixth lens element 160 is SAG62 (SAG62 is a negative value with the distance in parallel with the optical axis towards the object side; SAG62 is a positive value with the distance in parallel with the optical axis towards the image side), and the central thickness of the sixth lens element 160 is CT6, the following condition is satisfied: SAG62+CT6=−0.34 mm.

In the imaging optical lens assembly of the imaging apparatus according to the 1st embodiment, when a sum of central thicknesses of the first lens element 110, the second lens element 120, the third lens element 130, the fourth lens element 140, the fifth lens element 150 and the sixth lens element 160 is ΣCT, a sum of axial distances between every two of the first lens element 110, the second lens element 120, the third lens element 130, the fourth lens element 140, the fifth lens element 150 and the sixth lens element 160 that are adjacent to each other is ΣAT, and an axial distance between the aperture stop 100 and the image-side surface 162 of the sixth lens element 160 is SD, the following conditions is satisfied: (ΣCT+ΣAT)/SD=1.13.

In the imaging optical lens assembly of the imaging apparatus according to the 1st embodiment, when the sum of central thicknesses of the first lens element 110, the second lens element 120, the third lens element 130, the fourth lens element 140, the fifth lens element 150 and the sixth lens element 160 is ΣCT, and the sum of axial distances between every two of the first lens element 110, the second lens element 120, the third lens element 130, the fourth lens element 140, the fifth lens element 150 and the sixth lens element 160 that are adjacent to each other is ΣAT, the following conditions is satisfied: (ΣCT+ΣAT)/ΣCT=1.92.

In the imaging optical lens assembly of the imaging apparatus according to the 1st embodiment, when an axial distance between the object-side surface 111 of the first lens element 110 and the image surface 180 is TL, and the focal length of the imaging optical lens assembly is f, the following condition is satisfied: TL/f=0.89.

In the imaging optical lens assembly of the imaging apparatus according to the 1st embodiment, when the axial distance between the object-side surface 111 of the first lens element 110 and the image surface 180 is TL, and the maximum image height of the imaging optical lens assembly is ImgH, the following condition is satisfied: TL/ImgH=2.39.

In the imaging optical lens assembly of the imaging apparatus according to the 1st embodiment, when an Abbe number of the first lens element 110 is V1, an Abbe number of the second lens element 120 is V2, an Abbe number of the third lens element 130 is V3, the Abbe number of the fourth lens element 140 is V4, an Abbe number of the fifth lens element 150 is V5, and an Abbe number of the sixth lens element 160 is V6, two (V2=23.3 and V4=23.3) of V1, V2, V3, V4, V5 and V6 are smaller than 27.

In the imaging optical lens assembly of the imaging apparatus according to the 1st embodiment, when the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and the axial distance between the fifth lens element 150 and the sixth lens element 160 is T56, the following conditions are satisfied: 0<T12<T23<T56; 0<T12<T34<T56; 0<T45<T23<T56; and 0<T45<T34<T56.

The detailed optical data of the 1st embodiment are shown in TABLE 1 and the aspheric surface data are shown in TABLE 2 below.

TABLE 1

1st Embodiment
f = 5.96 mm, Fno = 2.60, HFOV = 20.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.520 |  |  |  |  |
| 2 | Lens 1 | 1.470 | ASP | 0.724 | Plastic | 1.544 | 55.9 | 3.06 |
| 3 |  | 10.314 | ASP | 0.040 |  |  |  |  |
| 4 | Lens 2 | 13.861 | ASP | 0.230 | Plastic | 1.640 | 23.3 | −4.18 |
| 5 |  | 2.225 | ASP | 0.213 |  |  |  |  |
| 6 | Lens 3 | 2.184 | ASP | 0.367 | Plastic | 1.544 | 55.9 | 8.71 |
| 7 |  | 3.808 | ASP | 0.416 |  |  |  |  |
| 8 | Lens 4 | −5.078 | ASP | 0.282 | Plastic | 1.640 | 23.3 | 9.04 |
| 9 |  | −2.763 | ASP | 0.082 |  |  |  |  |
| 10 | Lens 5 | 2.661 | ASP | 0.250 | Plastic | 1.544 | 55.9 | −4.39 |
| 11 |  | 1.218 | ASP | 1.469 |  |  |  |  |
| 12 | Lens 6 | −2.550 | ASP | 0.564 | Plastic | 1.544 | 55.9 | −9.39 |
| 13 |  | −5.490 | ASP | 0.200 |  |  |  |  |
| 14 | IR-cut filter | Plano |  | 0.248 | Glass | 1.517 | 64.2 | — |
| 15 |  | Plano |  | 0.247 |  |  |  |  |
| 16 | Image | Plano |  | — |  |  |  |  |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k= | 1.9460E−01 | 5.0000E+01 | −1.6068E+01 | −1.3294E+01 | −9.1291E+00 | −1.8655E+00 |
| A4= | −7.1745E−03 | −8.4996E−02 | −1.7160E−01 | −5.6189E−02 | −8.5960E−02 | −6.9795E−02 |

TABLE 2-continued

| Aspheric Coefficients | | | | | |
|---|---|---|---|---|---|
| A6= | −1.3657E−02 | 1.3690E−01 | 3.6558E−01 | 2.4124E−01 | 6.8717E−03 | −7.8050E−02 |
| A8= | 4.2785E−02 | −4.7390E−02 | −2.9545E−01 | −1.9055E−01 | −9.9892E−03 | 4.9883E−01 |
| A10= | −8.9690E−02 | −1.5905E−01 | −3.5146E−03 | 5.9696E−02 | 6.7751E−02 | 6.0343E−03 |
| A12= | 7.9306E−02 | 1.9358E−01 | 1.6061E−01 | 3.7867E−02 | −3.6768E−02 | −2.8121E−02 |
| A14= | −2.9319E−02 | −6.5167E−02 | −6.4322E−02 | 3.3392E−02 | 3.3756E−02 | 6.8361E−03 |

| Surface # | 8 | 9 | 10 | 11 | 12 | 13 |
|---|---|---|---|---|---|---|
| k= | 1.2565E+01 | 1.3525E+00 | −5.0000E+01 | −8.6049E+00 | −1.0000E+00 | 3.1952E+00 |
| A4= | 1.4312E−01 | 1.2711E−01 | −2.5156E−01 | −5.9708E−02 | −8.3429E−02 | −1.4058E−01 |
| A6= | −4.1327E−01 | −2.5818E−01 | 1.1497E−01 | 6.3295E−02 | 2.6635E−02 | 4.6297E−02 |
| A8= | 4.0174E−01 | 1.0637E−01 | −5.8806E−02 | 2.6270E−02 | −8.8252E−04 | −7.5781E−03 |
| A10= | −4.5780E−01 | −8.4257E−02 | 1.4106E−02 | −3.5400E−02 | 6.0690E−04 | −1.3933E−04 |
| A12= | 1.0455E−01 | 2.5202E−02 | 2.0375E−02 | 1.0639E−03 | 1.0922E−04 | 1.0766E−04 |
| A14= | 4.1473E−02 | 1.9252E−02 | −2.2911E−02 | 4.0078E−03 | −8.3472E−05 | −3.3106E−07 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided to again.

2nd Embodiment

Figure 3:
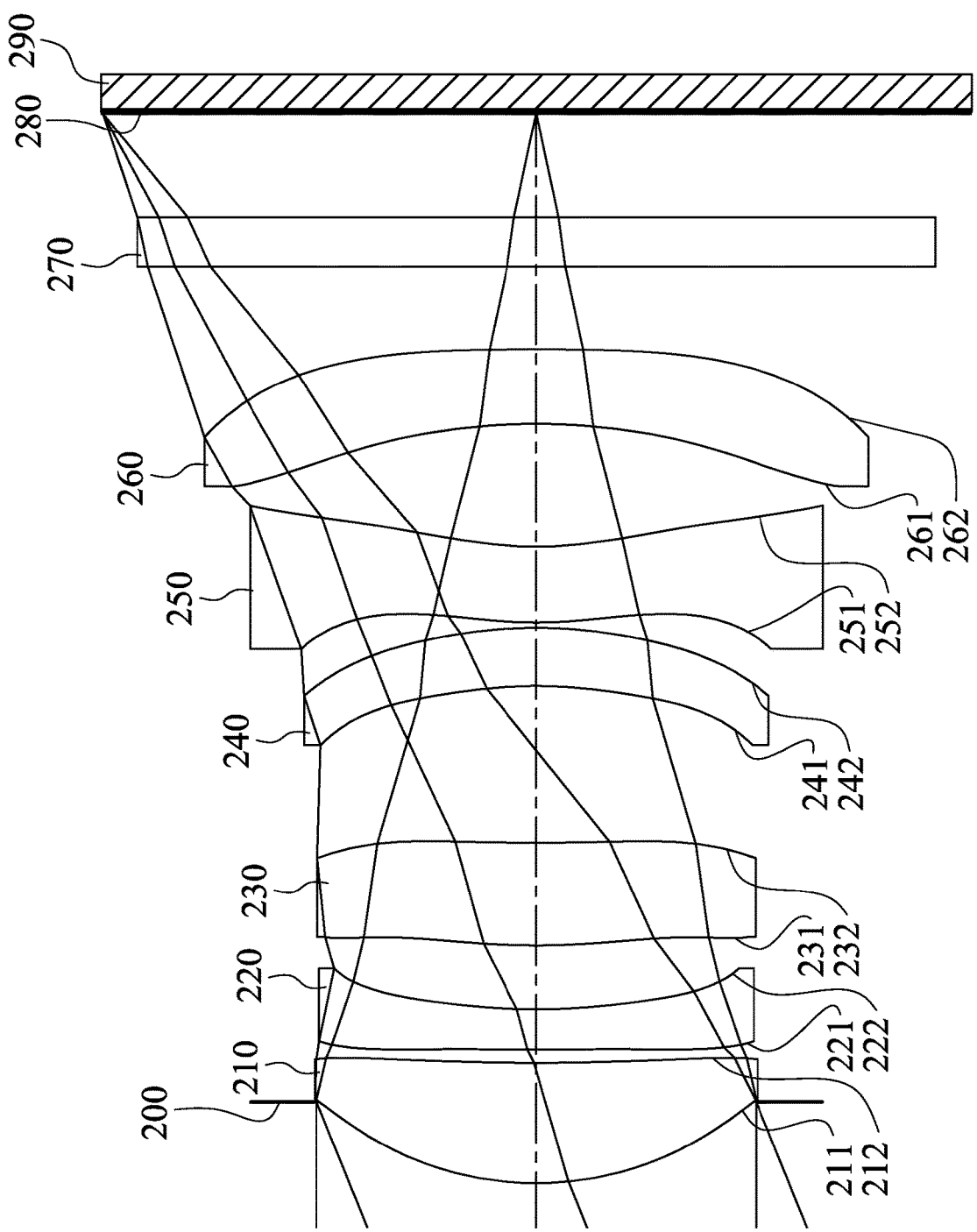
FIG. 3 is a schematic view of an imaging apparatus according to the 2nd embodiment of the present disclosure.
Figure 4:
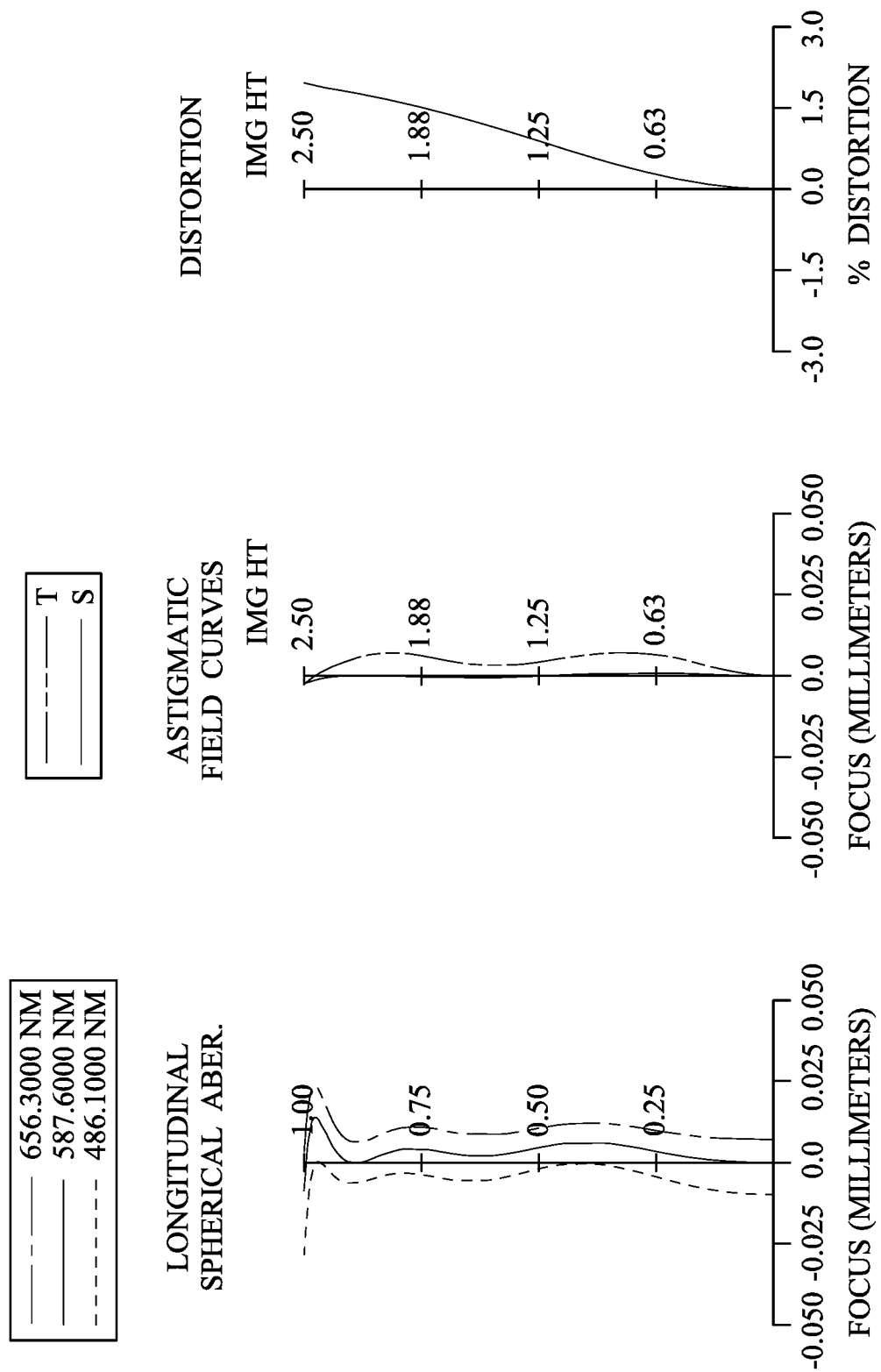
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows, in order from left to right, spherical aberration curves, astigmatic field curves and a distortion curve of the imaging apparatus according to the 2nd embodiment.

In FIG. 3, the imaging apparatus includes the imaging optical lens assembly (its reference numeral is omitted) and an image sensor 290. The imaging optical lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280. The image sensor 290 is disposed on the image surface 280 of the imaging optical lens assembly. The imaging optical lens assembly has a total of six lens elements (210-260) with refractive power. Moreover, there is an air gap between any two of the first lens element 210, the second lens element 220, the third lens element 230, the fourth lens element 240, the fifth lens element 250, and the sixth lens element 260 that are adjacent to each other and there is no relative movement among the lens elements (210-260) with refractive power.

The first lens element 210 with positive refractive power has a convex object-side surface 211 and a concave image-side surface 212. The first lens element 210 is made of plastic material and has both the object-side surface 211 and the image-side surface 212 being aspheric.

The second lens element 220 with negative refractive power has a convex object-side surface 221 and a concave image-side surface 222. The second lens element 220 is made of plastic material and has both the object-side surface 221 and the image-side surface 222 being aspheric.

The third lens element 230 with positive refractive power has a convex object-side surface 231 and a concave image-side surface 232. The third lens element 230 is made of plastic material and has both the object-side surface 231 and the image-side surface 232 being aspheric.

The fourth lens element 240 with positive refractive power has a concave object-side surface 241 and a convex image-side surface 242. The fourth lens element 240 is made of plastic material and has both the object-side surface 241 and the image-side surface 242 being aspheric.

The fifth lens element 250 with negative refractive power has a convex object-side surface 251 and a concave image-side surface 252. The fifth lens element 250 is made of plastic material and has both the object-side surface 251 and the image-side surface 252 being aspheric. Furthermore, the object-side surface 251 of the fifth lens element 250 has at least one inflection point. The object-side surface 251 of the fifth lens element 250 changes from a convex shape to a concave shape from a paraxial region thereof to an off-axis region thereof.

The sixth lens element 260 with negative refractive power has a concave object-side surface 261 and a convex image-side surface 262. The sixth lens element 260 is made of plastic material and has both the object-side surface 261 and the image-side surface 262 being aspheric. Furthermore, the object-side surface 261 of the sixth lens element 260 has at least one inflection point.

The IR-cut filter 270 is made of glass material and located between the sixth lens element 260 and the image surface 280, and will not affect the focal length of the imaging optical lens assembly.

Furthermore, in the imaging optical lens assembly of the imaging apparatus according to the 2nd embodiment, when an Abbe number of the first lens element 210 is V1, an Abbe number of the second lens element 220 is V2, an Abbe number of the third lens element 230 is V3, an Abbe number of the fourth lens element 240 is V4, an Abbe number of the fifth lens element 250 is V5, and an Abbe number of the sixth lens element 260 is V6, two (V2=23.3 and V4=23.3) of V1, V2, V3, V4, V5 and V6 are smaller than 27.

The detailed optical data of the 2nd embodiment are shown in TABLE 3 and the aspheric surface data are shown in TABLE 4 below.

TABLE 3

2nd Embodiment
f = 6.07 mm, Fno = 2.40, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.469 | | | | |
| 2 | Lens 1 | 1.856 | ASP | 0.694 | Plastic | 1.544 | 55.9 | 3.99 |
| 3 | | 11.180 | ASP | 0.077 | | | | |
| 4 | Lens 2 | 18.112 | ASP | 0.230 | Plastic | 1.640 | 23.3 | −6.58 |
| 5 | | 3.398 | ASP | 0.368 | | | | |
| 6 | Lens 3 | 4.073 | ASP | 0.592 | Plastic | 1.544 | 55.9 | 11.43 |
| 7 | | 11.198 | ASP | 0.901 | | | | |
| 8 | Lens 4 | −2.540 | ASP | 0.338 | Plastic | 1.640 | 23.3 | 58.81 |
| 9 | | −2.503 | ASP | 0.030 | | | | |
| 10 | Lens 5 | 2.595 | ASP | 0.435 | Plastic | 1.544 | 55.9 | −33.25 |
| 11 | | 2.136 | ASP | 0.706 | | | | |
| 12 | Lens 6 | −3.863 | ASP | 0.431 | Plastic | 1.544 | 55.9 | −8.71 |
| 13 | | −21.734 | ASP | 0.475 | | | | |
| 14 | IR-cut filter | Plano | | 0.285 | Glass | 1.517 | 64.2 | — |
| 15 | | Plano | | 0.609 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k= | 1.7378E−01 | −1.0000E+00 | 5.0000E+01 | −1.7548E+01 | −1.0073E+00 | −3.5173E+00 |
| A4= | −2.2843E−03 | −5.1227E−02 | −1.1750E−01 | −4.9402E−02 | −8.0771E−02 | −4.3747E−02 |
| A6= | −5.4466E−03 | 6.7566E−02 | 1.8145E−01 | 1.1190E−01 | −2.1948E−03 | −2.8477E−02 |
| A8= | 1.6515E−02 | −1.8551E−02 | −1.1029E−01 | −6.9735E−02 | −3.9664E−03 | 1.0613E−02 |
| A10= | −2.5082E−02 | −4.5702E−02 | −3.2424E−04 | 2.0478E−02 | 1.5094E−02 | 1.4782E−03 |
| A12= | 1.6995E−02 | 4.1245E−02 | 3.4657E−02 | 7.3267E−03 | −1.2059E−02 | −2.8401E−03 |
| A14= | −5.0445E−03 | −1.0730E−02 | −1.0908E−02 | −1.4475E−04 | 5.7860E−03 | 1.1588E−03 |

| Surface # | 8 | 9 | 10 | 11 | 12 | 13 |
|---|---|---|---|---|---|---|
| k= | −1.2659E+00 | 1.8214E−01 | −1.2613E+01 | −9.4963E+00 | −8.5912E+00 | −1.2603E+01 |
| A4= | 1.5739E−01 | 8.3586E−02 | −1.4953E−01 | −5.3190E−02 | −3.4194E−02 | −3.7245E−02 |
| A6= | −2.2709E−01 | −8.8761E−02 | 4.0819E−02 | 6.1885E−03 | 1.0457E−02 | 5.8712E−03 |
| A8= | 1.6973E−01 | 4.8741E−02 | −1.6126E−02 | 1.1721E−02 | −7.3614E−04 | −1.3906E−03 |
| A10= | −1.0303E−01 | −2.4788E−02 | 5.1557E−03 | −5.6278E−03 | 8.7954E−05 | 5.6291E−05 |
| A12= | 2.9620E−02 | 6.0066E−03 | −8.0000E−04 | 9.2690E−04 | 1.5610E−05 | −1.9796E−06 |
| A14= | −2.0459E−03 | −5.2468E−05 | −4.9155E−04 | −3.6645E−05 | −2.3279E−06 | −1.0960E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 6.07 | f/ImgH | 2.43 |
| Fno | 2.40 | f12/f3456 | −0.08 |
| HFOV (deg.) | 22.0 | Y11/Y62 | 0.67 |
| V4 | 23.3 | SAG62 + CT6 (mm) | −0.08 |
| Nmax | 1.640 | (ΣCT + ΣAT)/SD | 1.11 |
| CT6/T12 | 5.60 | (ΣCT + ΣAT)/ΣCT | 1.77 |
| T56/CTmax | 1.02 | TL/f | 1.02 |
| f/R1 | 3.27 | TL/ImgH | 2.47 |

3rd Embodiment

Figure 5:
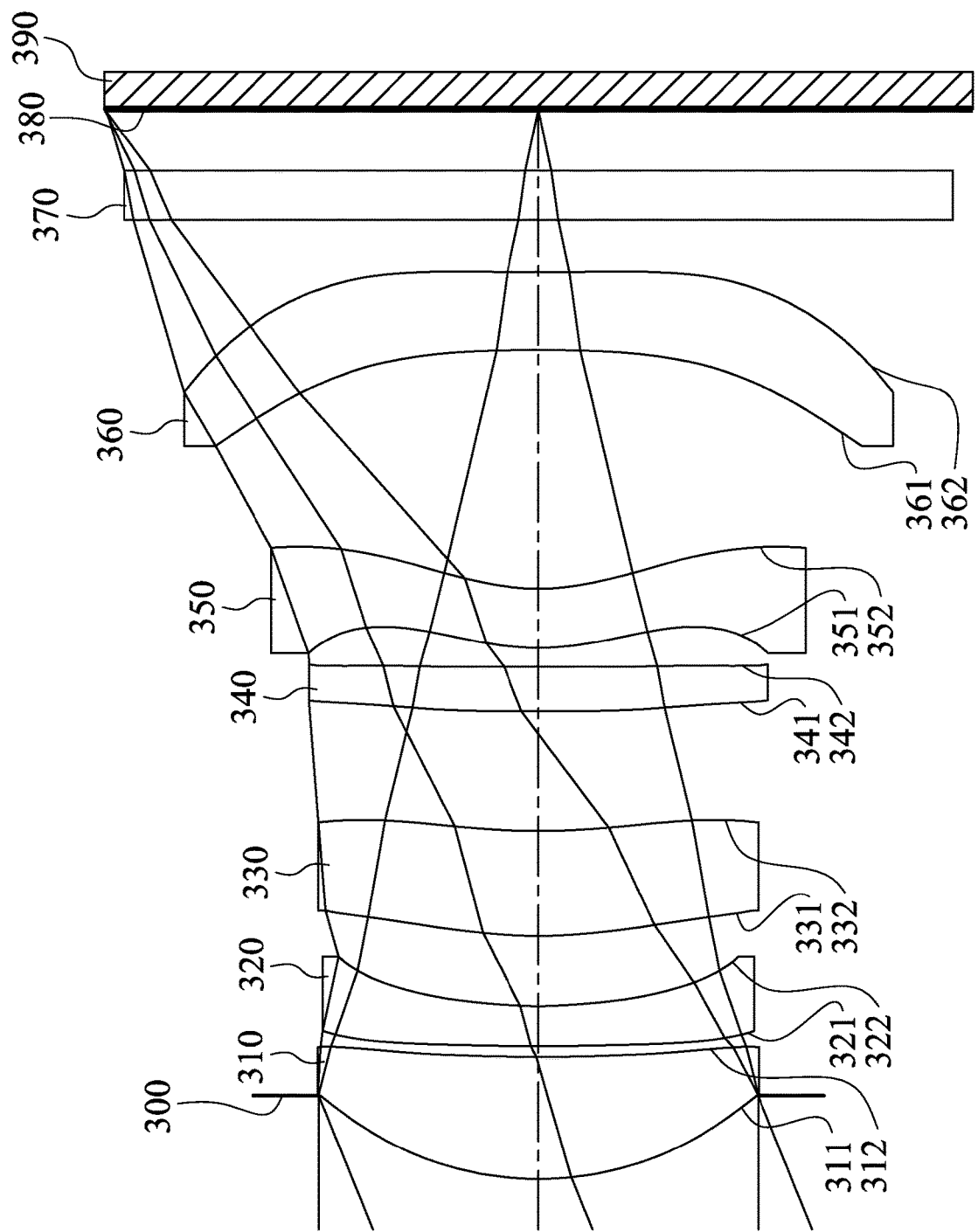
FIG. 5 is a schematic view of an imaging apparatus according to the 3rd embodiment of the present disclosure.
Figure 6:
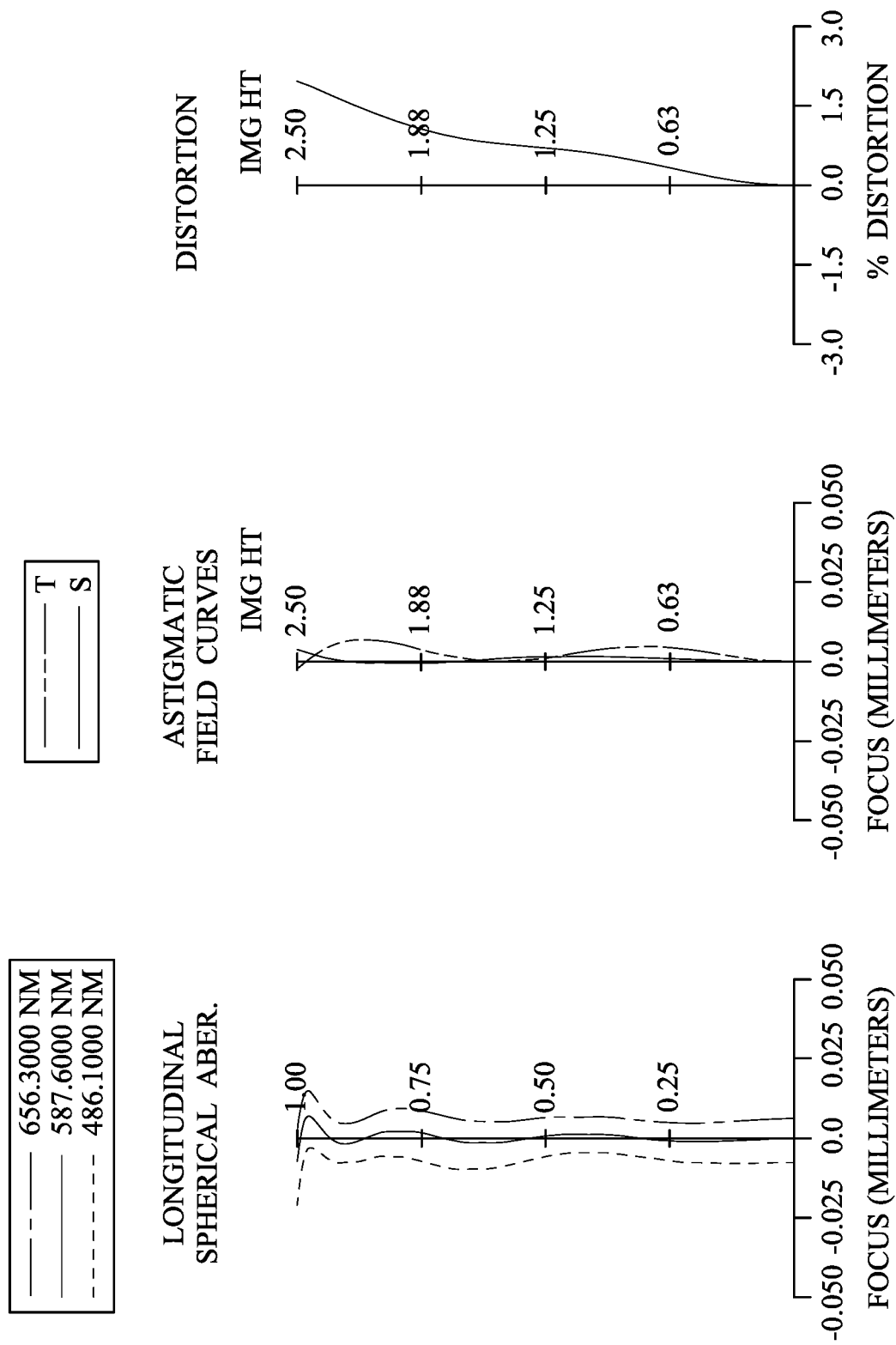
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows, in order from left to right, spherical aberration curves, astigmatic field curves and a distortion curve of the imaging apparatus according to the 3rd embodiment.

In FIG. 5, the imaging apparatus includes the imaging optical lens assembly (its reference numeral is omitted) and an image sensor 390. The imaging optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380. The image sensor 390 is disposed on the image surface 380 of the imaging optical lens assembly. The imaging optical lens assembly has a total of six lens elements (310-360) with refractive power. Moreover, there is an air gap between any two of the first lens element 310, the second lens element 320, the third lens element 330, the fourth lens element 340, the fifth lens element 350, and the sixth lens element 360 that are adjacent to each other and there is no relative movement among the lens elements (310-360) with refractive power.

The first lens element 310 with positive refractive power has a convex object-side surface 311 and a concave image-side surface 312. The first lens element 310 is made of plastic material and has both the object-side surface 311 and the image-side surface 312 being aspheric.

The second lens element 320 with negative refractive power has a convex object-side surface 321 and a concave image-side surface 322. The second lens element 320 is made of plastic material and has both the object-side surface 321 and the image-side surface 322 being aspheric.

The third lens element 330 with positive refractive power has a convex object-side surface 331 and a concave image-side surface 332. The third lens element 330 is made of plastic material and has both the object-side surface 331 and the image-side surface 332 being aspheric.

The fourth lens element 340 with positive refractive power has a convex object-side surface 341 and a convex image-side surface 342. The fourth lens element 340 is made of plastic material and has both the object-side surface 341 and the image-side surface 342 being aspheric.

The fifth lens element 350 with negative refractive power has a convex object-side surface 351 and a concave image-side surface 352. The fifth lens element 350 is made of plastic material and has both the object-side surface 351 and the image-side surface 352 being aspheric. Furthermore, both of the object-side surface 351 and the image-side surface 352 of the fifth lens element 350 have at least one inflection point. The object-side surface 351 of the fifth lens element 350 changes from a convex shape to a concave shape from a paraxial region thereof to an off-axis region thereof.

The sixth lens element 360 with negative refractive power has a concave object-side surface 361 and a concave image-side surface 362. The sixth lens element 360 is made of plastic material and has both the object-side surface 361 and the image-side surface 362 being aspheric. Furthermore, the image-side surface 362 of the sixth lens element 360 has at least one inflection point.

The IR-cut filter 370 is made of glass material and located between the sixth lens element 360 and the image surface 380, and will not affect the focal length of the imaging optical lens assembly.

Furthermore, in the imaging optical lens assembly of the imaging apparatus according to the 3rd embodiment, when an Abbe number of the first lens element 310 is V1, an Abbe number of the second lens element 320 is V2, an Abbe number of the third lens element 330 is V3, an Abbe number of the fourth lens element 340 is V4, an Abbe number of the fifth lens element 350 is V5, and an Abbe number of the sixth lens element 360 is V6, two (V2=23.3 and V4=23.3) of V1, V2, V3, V4, V5 and V6 are smaller than 27.

In the imaging optical lens assembly of the imaging apparatus according to the 3rd embodiment, when an axial distance between the first lens element 310 and the second lens element 320 is T12, an axial distance between the second lens element 320 and the third lens element 330 is T23, an axial distance between the third lens element 330 and the fourth lens element 340 is T34, an axial distance between the fourth lens element 340 and a fifth lens element 350 is T45, and the axial distance between the fifth lens element 350 and the sixth lens element 360 is T56, the following conditions are satisfied: 0<T12<T23<T56; 0<T12<T34<T56; 0<T45<T23<T56; and 0<T45<T34<T56.

The detailed optical data of the 3rd embodiment are shown in TABLE 5 and the aspheric surface data are shown in TABLE 6 below.

TABLE 5

3rd Embodiment
f = 6.07 mm, Fno = 2.40, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.481 | | | | |
| 2 | Lens 1 | 1.861 | ASP | 0.704 | Plastic | 1.544 | 55.9 | 4.13 |
| 3 | | 9.374 | ASP | 0.062 | | | | |
| 4 | Lens 2 | 9.904 | ASP | 0.230 | Plastic | 1.640 | 23.3 | −6.10 |
| 5 | | 2.773 | ASP | 0.405 | | | | |
| 6 | Lens 3 | 2.924 | ASP | 0.606 | Plastic | 1.544 | 55.9 | 17.68 |
| 7 | | 3.893 | ASP | 0.690 | | | | |
| 8 | Lens 4 | 662.205 | ASP | 0.256 | Plastic | 1.640 | 23.3 | 58.06 |
| 9 | | −39.348 | ASP | 0.110 | | | | |
| 10 | Lens 5 | 1.535 | ASP | 0.342 | Plastic | 1.544 | 55.9 | −117.41 |
| 11 | | 1.381 | ASP | 1.376 | | | | |
| 12 | Lens 6 | −10.997 | ASP | 0.449 | Plastic | 1.544 | 55.9 | −11.68 |
| 13 | | 15.281 | ASP | 0.300 | | | | |
| 14 | IR-cut filter | Plano | | 0.285 | Glass | 1.517 | 64.2 | — |
| 15 | | Plano | | 0.356 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k= | 2.2333E−01 | −1.0000E+00 | 4.9704E+01 | −1.1690E+01 | −2.9767E−02 | −5.3252E+00 |
| A4= | −4.4841E−04 | −4.0080E−02 | −1.1481E−01 | −3.2068E−02 | −7.6879E−02 | −4.3387E−02 |

TABLE 6-continued

| Aspheric Coefficients | | | | | |
|---|---|---|---|---|---|
| A6= | −7.8204E−03 | 7.0544E−02 | 1.8150E−01 | 1.1619E−01 | 1.2464E−02 | −2.2171E−02 |
| A8= | 1.9163E−02 | −2.0424E−02 | −1.1074E−01 | −7.0774E−02 | −4.2649E−03 | 1.5203E−02 |
| A10= | −2.5934E−02 | −4.6911E−02 | −2.2582E−03 | 2.0078E−02 | 1.1291E−02 | −4.9124E−04 |
| A12= | 1.6056E−02 | 4.1157E−02 | 3.3399E−02 | 7.0100E−03 | −1.2367E−02 | −5.6099E−03 |
| A14= | −4.4250E−03 | −1.0395E−02 | −1.0292E−02 | −9.6895E−04 | 5.0173E−03 | 2.4788E−03 |

| Surface # | 8 | 9 | 10 | 11 | 12 | 13 |
|---|---|---|---|---|---|---|
| k= | −5.0000E+01 | −1.4079E+01 | −4.3881E+00 | −3.3508E+00 | −1.0000E+00 | −5.0000E+01 |
| A4= | 1.4352E−01 | 7.6047E−02 | −1.4369E−01 | −9.8487E−02 | −6.7196E−02 | −7.1444E−02 |
| A6= | −2.0305E−02 | −9.8651E−02 | 1.3565E−02 | 7.7099E−02 | 1.3477E−02 | 1.0519E−02 |
| A8= | 1.6955E−01 | 5.8988E−02 | −1.3275E−02 | 1.1459E−02 | −1.4277E−03 | −1.4535E−03 |
| A10= | −1.0000E−01 | −2.2166E−02 | 8.0197E−03 | −5.3996E−03 | 1.7355E−05 | 1.1041E−04 |
| A12= | 3.4502E−02 | 4.3706E−03 | −1.8793E−03 | 9.5782E−04 | 3.9541E−05 | 6.5097E−08 |
| A14= | −4.5652E−03 | 3.3138E−04 | −2.6672E−04 | −4.3261E−05 | −3.7683E−06 | −1.4125E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 6.07 | f/ImgH | 2.43 |
| Fno | 2.40 | f12/f3456 | 0.11 |
| HFOV (deg.) | 22.0 | Y11/Y62 | 0.62 |
| V4 | 23.3 | SAG62 + CT6 (mm) | −0.25 |
| Nmax | 1.640 | (ΣCT + ΣAT)/SD | 1.10 |
| CT6/T12 | 7.24 | (ΣCT + ΣAT)/ΣCT | 2.02 |
| T56/CTmax | 1.95 | TL/f | 1.02 |
| f/R1 | 3.26 | TL/ImgH | 2.47 |

4th Embodiment

Figure 7:
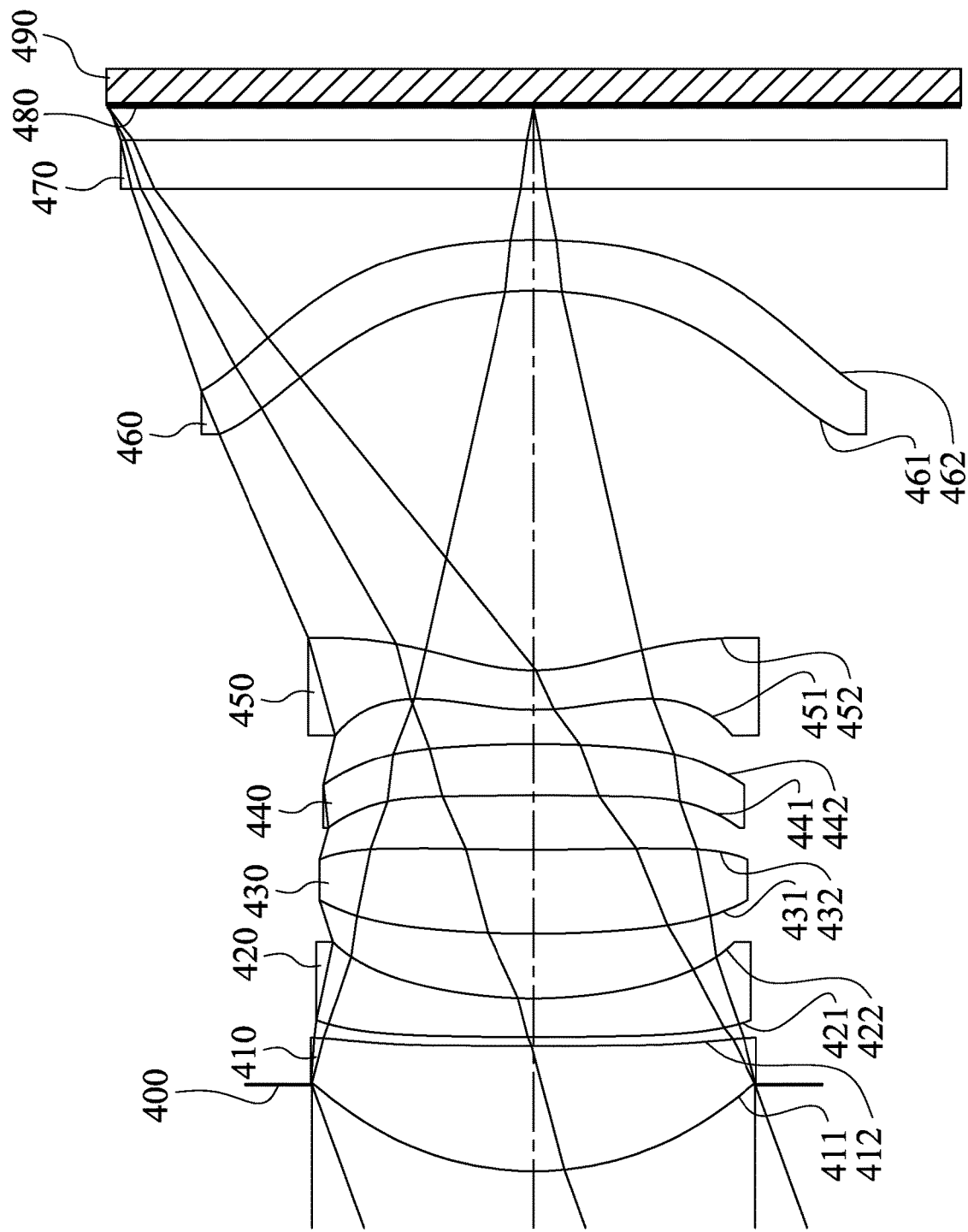
FIG. 7 is a schematic view of an imaging apparatus according to the 4th embodiment of the present disclosure.
Figure 8:
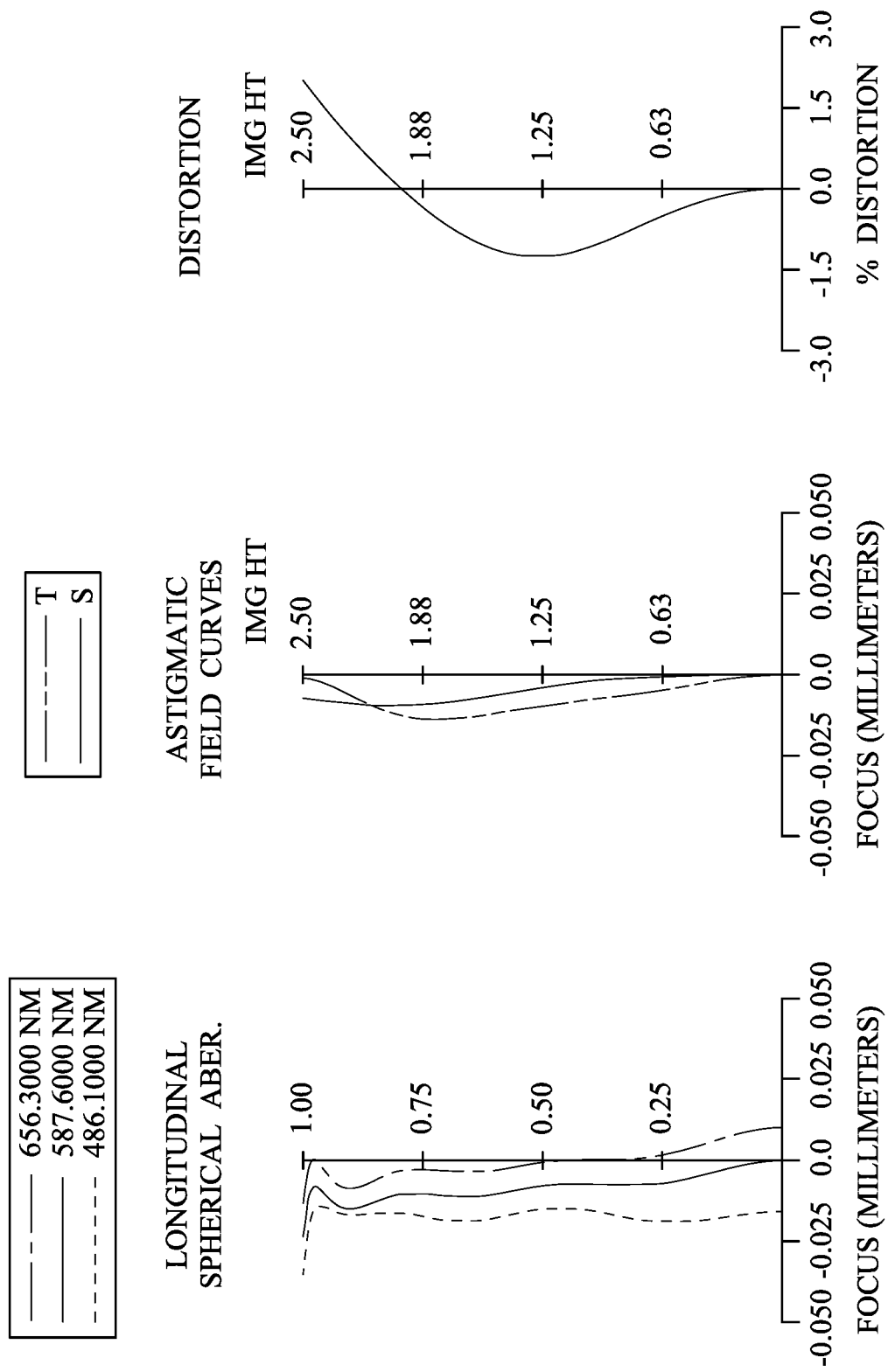
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows, in order from left to right, spherical aberration curves, astigmatic field curves and a distortion curve of the imaging apparatus according to the 4th embodiment.

In FIG. 7, the imaging apparatus includes the imaging optical lens assembly (its reference numeral is omitted) and an image sensor 490. The imaging optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480. The image sensor 490 is disposed on the image surface 480 of the imaging optical lens assembly. The imaging optical lens assembly has a total of six lens elements (410-460) with refractive power. Moreover, there is an air gap between any two of the first lens element 410, the second lens element 420, the third lens element 430, the fourth lens element 440, the fifth lens element 450, and the sixth lens element 460 that are adjacent to each other and there is no relative movement among the lens elements (410-460) with refractive power.

The first lens element 410 with positive refractive power has a convex object-side surface 411 and a concave image-side surface 412. The first lens element 410 is made of plastic material and has both the object-side surface 411 and the image-side surface 412 being aspheric.

The second lens element 420 with negative refractive power has a convex object-side surface 421 and a concave image-side surface 422. The second lens element 420 is made of plastic material and has both the object-side surface 421 and the image-side surface 422 being aspheric.

The third lens element 430 with positive refractive power has a convex object-side surface 431 and a concave image-side surface 432. The third lens element 430 is made of plastic material and has both the object-side surface 431 and the image-side surface 432 being aspheric.

The fourth lens element 440 with positive refractive power has a concave object-side surface 441 and a convex image-side surface 442. The fourth lens element 440 is made of plastic material and has both the object-side surface 441 and the image-side surface 442 being aspheric.

The fifth lens element 450 with negative refractive power has a convex object-side surface 451 and a concave image-side surface 452. The fifth lens element 450 is made of plastic material and has both the object-side surface 451 and the image-side surface 452 being aspheric. Furthermore, both of the object-side surface 451 and the image-side surface 452 of the fifth lens element 450 have at least one inflection point. The object-side surface 451 of the fifth lens element 450 changes from a convex shape to a concave shape from a paraxial region thereof to an off-axis region thereof.

The sixth lens element 460 with negative refractive power has a concave object-side surface 461 and a convex image-side surface 462. The sixth lens element 460 is made of plastic material and has both the object-side surface 461 and the image-side surface 462 being aspheric. Furthermore, the object-side surface 461 of the sixth lens element 460 has at least one inflection point.

The IR-cut filter 470 is made of glass material and located between the sixth lens element 460 and the image surface 480, and will not affect the focal length of the imaging optical lens assembly.

Furthermore, in the imaging optical lens assembly of the imaging apparatus according to the 4th embodiment, when an Abbe number of the first lens element 410 is V1, an Abbe number of the second lens element 420 is V2, an Abbe number of the third lens element 430 is V3, an Abbe number of the fourth lens element 440 is V4, an Abbe number of the fifth lens element 450 is V5, and an Abbe number of the sixth lens element 460 is V6, three (V2=23.3, V4=21.4 and V6=21.4) of V1, V2, V3, V4, V5 and V6 are smaller than 27.

In the imaging optical lens assembly of the imaging apparatus according to the 4th embodiment, when an axial distance between the first lens element 410 and the second lens element 420 is T12, an axial distance between the second lens element 420 and the third lens element 430 is T23, an axial distance between the third lens element 430 and the fourth lens element 440 is T34, an axial distance between the fourth lens element 440 and a fifth lens element 450 is T45, and the axial distance between the fifth lens element 450 and the sixth lens element 460 is T56, the following conditions are satisfied: 0<T12<T23<T56; 0<T12<T34<T56; 0<T45<T23<T56; and 0<T45<T34<T56.

The detailed optical data of the 4th embodiment are shown in TABLE 7 and the aspheric surface data are shown in TABLE 8 below.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 6.75 | f/ImgH | 2.70 |
| Fno | 2.60 | f12/f3456 | −0.54 |
| HFOV (deg.) | 20.0 | Y11/Y62 | 0.67 |
| V4 | 21.4 | SAG62 + CT6 (mm) | −0.59 |
| Nmax | 1.650 | (ΣCT + ΣAT)/SD | 1.10 |

TABLE 7

4th Embodiment
f = 6.75 mm, Fno = 2.60, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.507 | | | | |
| 2 | Lens 1 | 1.835 | ASP | 0.734 | Plastic | 1.544 | 55.9 | 3.49 |
| 3 | | 45.643 | ASP | 0.051 | | | | |
| 4 | Lens 2 | 12.513 | ASP | 0.230 | Plastic | 1.639 | 23.5 | −5.39 |
| 5 | | 2.682 | ASP | 0.379 | | | | |
| 6 | Lens 3 | 6.769 | ASP | 0.491 | Plastic | 1.535 | 55.7 | 21.98 |
| 7 | | 15.548 | ASP | 0.318 | | | | |
| 8 | Lens 4 | −18.982 | ASP | 0.304 | Plastic | 1.650 | 21.4 | 14.40 |
| 9 | | −6.307 | ASP | 0.200 | | | | |
| 10 | Lens 5 | 1.671 | ASP | 0.230 | Plastic | 1.535 | 55.7 | −8.67 |
| 11 | | 1.169 | ASP | 2.224 | | | | |
| 12 | Lens 6 | −2.533 | ASP | 0.299 | Plastic | 1.650 | 21.4 | −9.96 |
| 13 | | 4.355 | ASP | 0.300 | | | | |
| 14 | IR-cut filter | Plano | | 0.285 | Glass | 1.517 | 64.2 | — |
| 15 | | Plano | | 0.203 | | | | |
| 16 | Image | Plano | | — | | | | |

Note:
Reference wavelength is 587.6 nm (d-line).

TABLE 8

| Aspheric Coefficients | | | | | | |
|---|---|---|---|---|---|---|
| Surface # | 2 | 3 | 4 | 5 | 6 | 7 |
| k= | 1.2596E−01 | −1.0000E+00 | 5.0000E+01 | −6.7314E+00 | 9.2963E+00 | −4.0457E+01 |
| A4= | −2.8799E−04 | −3.3261E−02 | −9.9567E−02 | −2.5714E−02 | −1.6535E−02 | −2.6025E−02 |
| A6= | −1.3309E−02 | 8.4736E−02 | 1.8198E−01 | 1.1508E−01 | 3.1761E−02 | −2.1431E−02 |
| A8= | 2.4365E−02 | −1.9405E−02 | −1.0901E−01 | −7.4308E−02 | −1.4777E−03 | 3.0201E−02 |
| A10= | −2.5891E−02 | −5.0215E−02 | −3.6966E−02 | 2.0047E−02 | 6.7774E−03 | −4.4171E−03 |
| A12= | 1.3832E−02 | 4.0309E−02 | 3.1215E−02 | 1.0601E−02 | −7.0068E−03 | −1.4514E−02 |
| A14= | −3.4429E−03 | −9.4700E−03 | −8.9112E−03 | −3.9518E−03 | 1.4524E−03 | 4.9649E−03 |

| Surface # | 8 | 9 | 10 | 11 | 12 | 13 |
|---|---|---|---|---|---|---|
| k= | 4.0451E+01 | 1.4096E+01 | −7.5169E+00 | −4.6130E+00 | −2.8151E+00 | 3.0008E+00 |
| A4= | 6.4209E−02 | 6.0062E−02 | −2.4726E−01 | −1.6188E−01 | −8.0876E−02 | −8.5266E−02 |
| A6= | −1.9999E−01 | −1.3610E−01 | 4.5228E−02 | 4.6699E−02 | 1.7365E−02 | 2.3127E−02 |
| A8= | 1.5497E−01 | 5.8528E−02 | −2.6939E−02 | 1.3031E−02 | −1.3021E−03 | −3.3035E−03 |
| A10= | −9.9971E−02 | −1.5917E−02 | 5.0002E−04 | −1.3123E−02 | 1.9333E−04 | 4.9053E−04 |
| A12= | 3.3689E−02 | 5.6644E−03 | 1.3810E−02 | 2.8642E−03 | 1.2486E−04 | −2.6989E−05 |
| A14= | −2.4741E−03 | −6.1617E−04 | −8.9917E−03 | 4.0047E−05 | −2.5616E−05 | 5.3533E−06 |

-continued

| 4th Embodiment | | | |
|---|---|---|---|
| CT6/T12 | 5.86 | (ΣCT + ΣAT)/ΣCT | 2.39 |
| T56/CTmax | 3.03 | TL/f | 0.93 |
| f/R1 | 3.68 | TL/ImgH | 2.50 |

5th Embodiment

Figure 9:
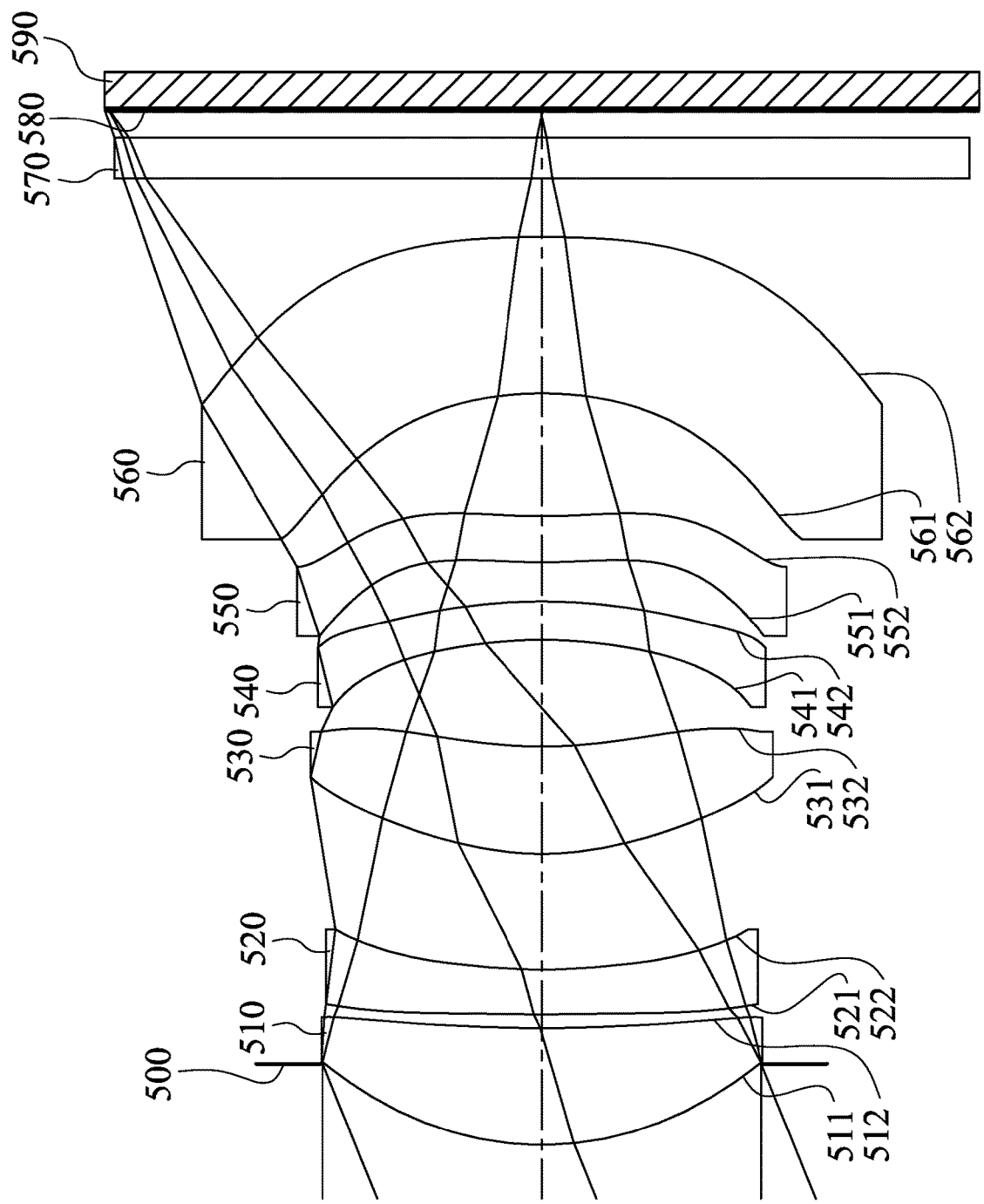
FIG. 9 is a schematic view of an imaging apparatus according to the 5th embodiment of the present disclosure.
Figure 10:
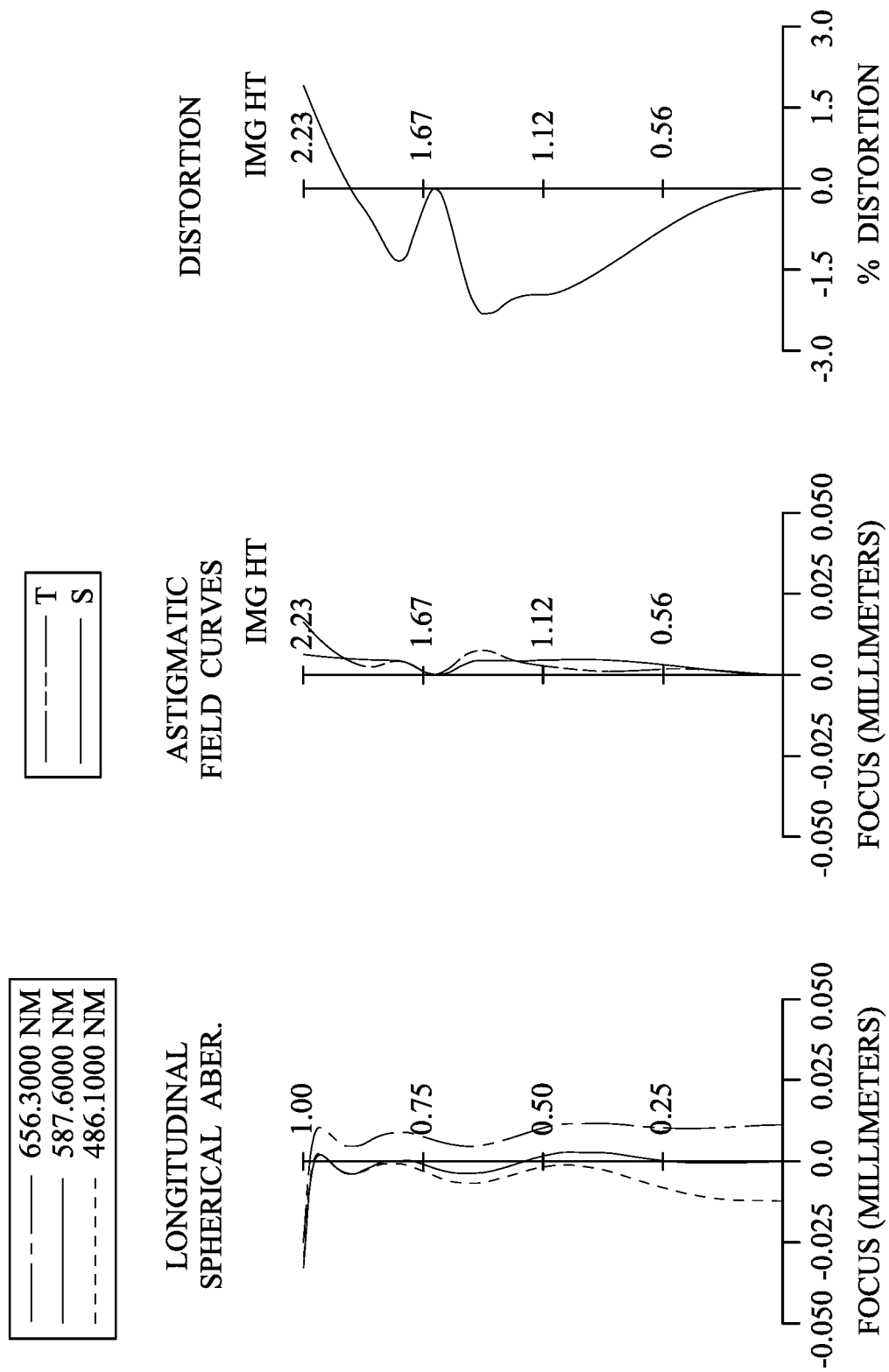
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows, in order from left to right, spherical aberration curves, astigmatic field curves and a distortion curve of the imaging apparatus according to the 5th embodiment.

In FIG. 9, the imaging apparatus includes the imaging optical lens assembly (its reference numeral is omitted) and an image sensor 590. The imaging optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580. The image sensor 590 is disposed on the image surface 580 of the imaging optical lens assembly. The imaging optical lens assembly has a total of six lens elements (510-560) with refractive power. Moreover, there is an air gap between any two of the first lens element 510, the second lens element 520, the third lens element 530, the fourth lens element 540, the fifth lens element 550, and the sixth lens element 560 that are adjacent to each other and there is no relative movement among the lens elements (510-560) with refractive power.

The first lens element 510 with positive refractive power has a convex object-side surface 511 and a concave image-side surface 512. The first lens element 510 is made of plastic material and has both the object-side surface 511 and the image-side surface 512 being aspheric.

The second lens element 520 with negative refractive power has a convex object-side surface 521 and a concave image-side surface 522. The second lens element 520 is made of plastic material and has both the object-side surface 521 and the image-side surface 522 being aspheric.

The third lens element 530 with positive refractive power has a convex object-side surface 531 and a concave image-side surface 532. The third lens element 530 is made of plastic material and has both the object-side surface 531 and the image-side surface 532 being aspheric.

The fourth lens element 540 with negative refractive power has a concave object-side surface 541 and a convex image-side surface 542. The fourth lens element 540 is made of plastic material and has both the object-side surface 541 and the image-side surface 542 being aspheric.

The fifth lens element 550 with positive refractive power has a convex object-side surface 551 and a concave image-side surface 552. The fifth lens element 550 is made of plastic material and has both the object-side surface 551 and the image-side surface 552 being aspheric. Furthermore, both of the object-side surface 551 and the image-side surface 552 of the fifth lens element 550 have at least one inflection point. The object-side surface 551 of the fifth lens element 550 changes from a convex shape to a concave shape from a paraxial region thereof to an off-axis region thereof.

The sixth lens element 560 with negative refractive power has a concave object-side surface 561 and a convex image-side surface 562. The sixth lens element 560 is made of plastic material and has both the object-side surface 561 and the image-side surface 562 being aspheric. Furthermore, the object-side surface 561 of the sixth lens element 560 has at least one inflection point.

The IR-cut filter 570 is made of glass material and located between the sixth lens element 560 and the image surface 580, and will not affect the focal length of the imaging optical lens assembly.

In the imaging optical lens assembly of the imaging apparatus according to the 5th embodiment, when an axial distance between the first lens element 510 and the second lens element 520 is T12, an axial distance between the second lens element 520 and the third lens element 530 is T23, an axial distance between the third lens element 530 and the fourth lens element 540 is T34, an axial distance between the fourth lens element 540 and a fifth lens element 550 is T45, and the axial distance between the fifth lens element 550 and the sixth lens element 560 is T56, the following conditions are satisfied: 0<T12<T23<T56; 0<T12<T34<T56; 0<T45<T23<T56; and 0<T45<T34<T56.

The detailed optical data of the 5th embodiment are shown in TABLE 9 and the aspheric surface data are shown in TABLE 10 below.

TABLE 9

5th Embodiment
f = 5.42 mm, Fno = 2.40, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.418 | | | | |
| 2 | Lens 1 | 1.655 | ASP | 0.601 | Plastic | 1.535 | 55.7 | 3.94 |
| 3 | | 6.736 | ASP | 0.071 | | | | |
| 4 | Lens 2 | 10.246 | ASP | 0.230 | Plastic | 1.650 | 21.4 | −6.84 |
| 5 | | 3.071 | ASP | 0.598 | | | | |
| 6 | Lens 3 | 1.631 | ASP | 0.551 | Plastic | 1.544 | 55.9 | 7.15 |
| 7 | | 2.473 | ASP | 0.549 | | | | |
| 8 | Lens 4 | −2.305 | ASP | 0.200 | Plastic | 1.544 | 55.9 | −33.76 |
| 9 | | −2.717 | ASP | 0.200 | | | | |
| 10 | Lens 5 | 3.315 | ASP | 0.238 | Plastic | 1.544 | 55.9 | 1006.78 |
| 11 | | 3.251 | ASP | 0.632 | | | | |
| 12 | Lens 6 | −1.804 | ASP | 0.806 | Plastic | 1.535 | 55.7 | −4.90 |
| 13 | | −6.679 | ASP | 0.300 | | | | |
| 14 | IR-cut filter | Plano | | 0.210 | Glass | 1.517 | 64.2 | — |

TABLE 9-continued

5th Embodiment
f = 5.42 mm, Fno = 2.40, HFOV = 22.0 deg.

| Surface # | | Curvature Radius | Thickness | Material | Index | Abbe # | Focal Length |
|---|---|---|---|---|---|---|---|
| 15 | | Plano | 0.147 | | | | |
| 16 | Image | Plano | — | | | | |

Note:
Reference wavelength is 587.6 nm (d-line).

TABLE 10

| Aspheric Coefficients | | | | | | |
|---|---|---|---|---|---|---|
| Surface # | 2 | 3 | 4 | 5 | 6 | 7 |
| k= | 4.3616E−01 | −1.0000E+00 | 1.3577E+01 | −1.2145E+01 | −2.9240E+00 | −1.0000E+00 |
| A4= | −1.2220E−02 | −8.8410E−02 | −1.7082E−01 | −8.0685E−02 | −1.5974E−02 | −7.4788E−02 |
| A6= | −2.3220E−02 | 1.5973E−01 | 3.5830E−01 | 2.5427E−01 | 1.8284E−02 | −5.3216E−02 |
| A8= | 5.7066E−02 | −6.1857E−02 | −2.7622E−01 | −2.0426E−01 | −2.7264E−02 | 2.6338E−02 |
| A10= | −9.6752E−02 | −1.6488E−01 | −7.0033E−03 | 5.3188E−02 | 5.5564E−02 | −4.0540E−05 |
| A12= | 6.7099E−02 | 2.0231E−01 | 1.3979E−01 | 5.1809E−02 | −4.6149E−02 | −2.0941E−02 |
| A14= | −1.9418E−02 | −6.8664E−02 | −5.8961E−02 | −3.1468E−02 | 1.6014E−02 | 1.3043E−02 |
| Surface # | 8 | 9 | 10 | 11 | 12 | 13 |
| k= | 1.4461E+00 | 1.8665E+00 | −5.0000E+01 | −4.7148E+01 | −1.2183E+00 | 4.0930E+00 |
| A4= | 1.6807E−01 | 9.3275E−02 | −3.5624E−01 | −2.9584E−01 | −1.2495E−01 | −1.3358E−01 |
| A6= | −3.9083E−01 | −1.5366E−01 | 4.4013E−02 | 5.6045E−02 | 1.5797E−02 | 4.5014E−02 |
| A8= | 4.5244E−01 | 1.8712E−01 | −3.2451E−02 | 1.1562E−02 | 1.5745E−03 | −8.0235E−03 |
| A10= | −3.5241E−01 | −7.7037E−02 | 3.9325E−02 | −1.4446E−02 | 5.8587E−03 | −5.7257E−04 |
| A12= | 1.4616E−01 | 1.3536E−02 | 2.9391E−02 | 1.5624E−02 | −1.5646E−02 | 3.8901E−05 |
| A14= | −3.5575E−02 | −1.3044E−02 | −7.4786E−03 | −1.7771E−03 | 7.3600E−03 | 7.0461E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 5.42 | f/ImgH | 2.43 |
| Fno | 2.40 | f12/f3456 | −0.20 |
| HFOV (deg.) | 22.0 | Y11/Y62 | 0.65 |
| V4 | 55.9 | SAG62 + CT6 (mm) | −0.06 |
| Nmax | 1.650 | (ΣCT + ΣAT)/SD | 1.10 |
| CT6/T12 | 11.35 | (ΣCT + ΣAT)/ΣCT | 1.78 |
| T56/CTmax | 0.78 | TL/f | 0.98 |
| f/R1 | 3.27 | TL/ImgH | 2.39 |

6th Embodiment

Figure 11:
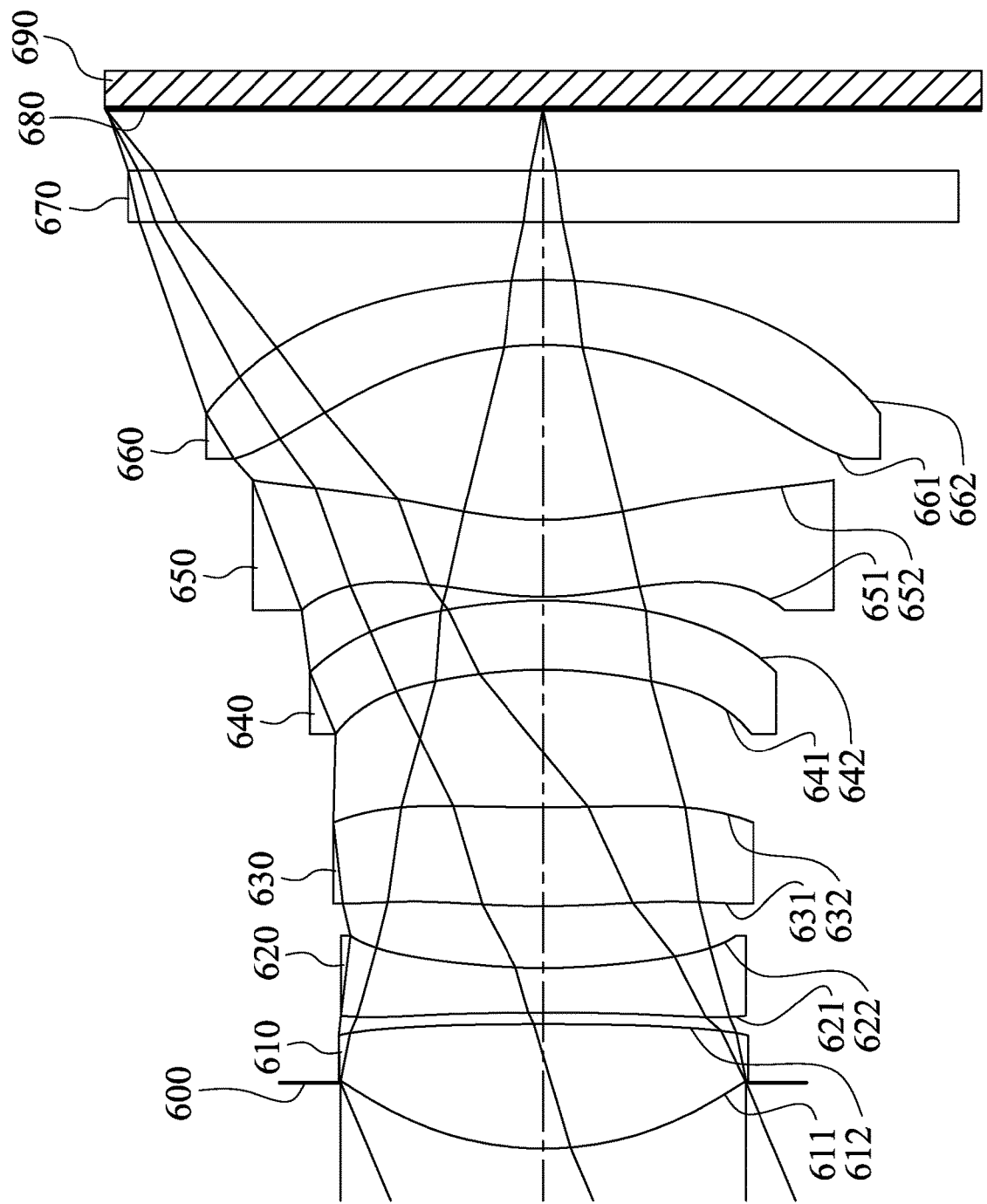
FIG. 11 is a schematic view of an imaging apparatus according to the 6th embodiment of the present disclosure.
Figure 12:
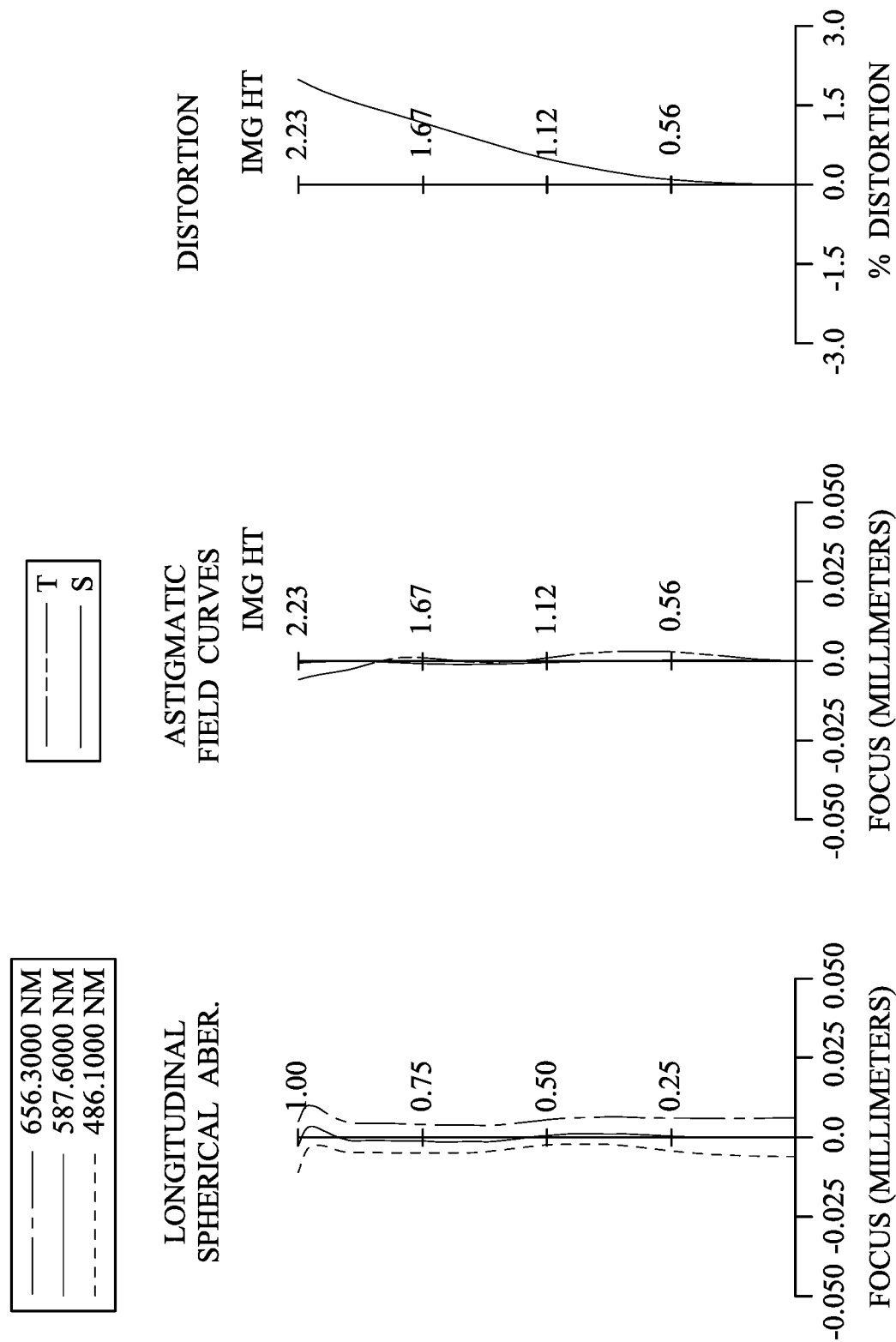
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows, in order from left to right, spherical aberration curves, astigmatic field curves and a distortion curve of the imaging apparatus according to the 6th embodiment.

In FIG. 11, the imaging apparatus includes the imaging optical lens assembly (its reference numeral is omitted) and an image sensor 690. The imaging optical lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680. The image sensor 690 is disposed on the image surface 180 of the imaging optical lens assembly. The imaging optical lens assembly has a total of six lens elements (610-660) with refractive power. Moreover, there is an air gap between any two of the first lens element 610, the second lens element 620, the third lens element 630, the fourth lens element 640, the fifth lens element 650, and the sixth lens element 660 that are adjacent to each other and there is no relative movement among the lens elements (610-660) with refractive power.

The first lens element 610 with positive refractive power has a convex object-side surface 611 and a convex image-side surface 612. The first lens element 610 is made of plastic material and has both the object-side surface 611 and the image-side surface 612 being aspheric.

The second lens element 620 with negative refractive power has a concave object-side surface 621 and a concave image-side surface 622. The second lens element 620 is made of plastic material and has both the object-side surface 621 and the image-side surface 622 being aspheric.

The third lens element 630 with positive refractive power has a convex object-side surface 631 and a concave image-side surface 632. The third lens element 630 is made of plastic material and has both the object-side surface 631 and the image-side surface 632 being aspheric.

The fourth lens element 640 with negative refractive power has a concave object-side surface 641 and a convex image-side surface 642. The fourth lens element 640 is made of plastic material and has both the object-side surface 641 and the image-side surface 642 being aspheric.

The fifth lens element 650 with positive refractive power has a convex object-side surface 651 and a concave image-side surface 652. The fifth lens element 650 is made of plastic material and has both the object-side surface 651 and the image-side surface 652 being aspheric. Furthermore, both of the object-side surface 651 and the image-side surface 652 of the fifth lens element 650 have at least one inflection point. The object-side surface 651 of the fifth lens element 650 changes from a convex shape to a concave shape from a paraxial region thereof to an off-axis region thereof.

The sixth lens element 660 with negative refractive power has a concave object-side surface 661 and a convex image-side surface 662. The sixth lens element 660 is made of plastic material and has both the object-side surface 661 and the image-side surface 662 being aspheric. Furthermore, the object-side surface 661 of the sixth lens element 660 has at least one inflection point.

The IR-cut filter 670 is made of glass material and located between the sixth lens element 660 and the image surface 680, and will not affect the focal length of the imaging optical lens assembly.

Furthermore, in the imaging optical lens assembly of the imaging apparatus according to the 6th embodiment, when an Abbe number of the first lens element 610 is V1, an Abbe number of the second lens element 620 is V2, an Abbe number of the third lens element 630 is V3, an Abbe number of the fourth lens element 640 is V4, an Abbe number of the fifth lens element 650 is V5, and an Abbe number of the sixth lens element 660 is V6, two (V2=25.6 and V4=21.4) of V1, V2, V3, V4, V5 and V6 are smaller than 27.

In the imaging optical lens assembly of the imaging apparatus according to the 6th embodiment, when an axial distance between the first lens element 610 and the second lens element 620 is T12, an axial distance between the second lens element 620 and the third lens element 630 is T23, an axial distance between the third lens element 630 and the fourth lens element 640 is T34, an axial distance between the fourth lens element 640 and a fifth lens element 650 is T45, and the axial distance between the fifth lens element 650 and the sixth lens element 660 is T56, the following conditions are satisfied: 0<T12<T23<T56; 0<T12<T34<T56; 0<T45<T23<T56; and 0<T45<T34<T56.

The detailed optical data of the 6th embodiment are shown in TABLE 11 and the aspheric surface data are shown in TABLE 12 below.

TABLE 11

6th Embodiment
f = 5.15 mm, Fno = 2.50, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.336 | | | | |
| 2 | Lens 1 | 1.644 | ASP | 0.634 | Plastic | 1.530 | 55.8 | 2.98 |
| 3 | | −34.117 | ASP | 0.057 | | | | |
| 4 | Lens 2 | −64.185 | ASP | 0.230 | Plastic | 1.614 | 25.6 | −4.94 |
| 5 | | 3.188 | ASP | 0.315 | | | | |
| 6 | Lens 3 | 4.626 | ASP | 0.503 | Plastic | 1.530 | 55.8 | 15.60 |
| 7 | | 10.109 | ASP | 0.703 | | | | |
| 8 | Lens 4 | −2.203 | ASP | 0.352 | Plastic | 1.650 | 21.4 | −146.24 |
| 9 | | −2.397 | ASP | 0.020 | | | | |
| 10 | Lens 5 | 1.806 | ASP | 0.391 | Plastic | 1.530 | 55.8 | 139.42 |
| 11 | | 1.712 | ASP | 0.891 | | | | |
| 12 | Lens 6 | −1.837 | ASP | 0.330 | Plastic | 1.530 | 55.8 | −7.02 |
| 13 | | −3.854 | ASP | 0.300 | | | | |
| 14 | IR-cut filter | Plano | | 0.260 | Glass | 1.517 | 64.2 | — |
| 15 | | Plano | | 0.315 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k= | 1.2654E−01 | −1.0000E+00 | −5.0000E+01 | −1.9659E+01 | −1.0000E+01 | −2.8463E+01 |
| A4= | −2.4927E−03 | −8.6248E−02 | −1.7159E−01 | −6.9235E−02 | −1.1597E−01 | −7.1597E−02 |
| A6= | −1.8464E−02 | 1.3957E−01 | 3.6160E−01 | 2.2052E−01 | 1.1107E−02 | −4.8755E−02 |
| A8= | 4.5709E−02 | −4.7487E−02 | −2.9257E−01 | −1.9288E−01 | −6.7357E−03 | 2.4864E−02 |
| A10= | −8.7140E−02 | −1.6203E−02 | 2.7957E−01 | 7.5139E−02 | 4.2751E−02 | 1.5568E−03 |
| A12= | 7.6571E−02 | 1.8948E−01 | 1.6079E−01 | 3.7867E−02 | −5.9113E−02 | −1.5567E−02 |
| A14= | −3.3550E−02 | −6.6977E−02 | −6.8773E−02 | −9.7848E−03 | 4.2349E−02 | 9.6223E−03 |

| Surface # | 8 | 9 | 10 | 11 | 12 | 13 |
|---|---|---|---|---|---|---|
| k= | −7.0155E−01 | 5.1647E−01 | −6.7710E+00 | −7.6443E+00 | −2.9201E+00 | 3.3329E−01 |
| A4= | 2.2368E−01 | 1.0506E−01 | −2.1298E−01 | −8.8842E−02 | −6.0816E−02 | −4.1518E−02 |
| A6= | −4.6445E−01 | −1.7474E−01 | 8.5405E−02 | 9.3693E−03 | 2.2988E−02 | 1.4491E−02 |
| A8= | 4.5149E−01 | 1.3238E−01 | −4.0498E−02 | 3.1194E−02 | −1.5438E−03 | −4.0663E−03 |
| A10= | −3.6106E−01 | −8.6280E−02 | 1.5625E−02 | −1.9359E−02 | 2.2878E−04 | 1.0786E−04 |
| A12= | 1.3584E−01 | 2.9434E−02 | −5.4203E−03 | 4.4252E−03 | 4.4273E−05 | −1.6217E−05 |
| A14= | −1.7714E−02 | −2.7244E−03 | −7.2865E−04 | −2.9371E−04 | 4.4629E−07 | 7.5068E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 5.15 | f/ImgH | 2.31 |
| Fno | 2.50 | f12/f3456 | −0.30 |
| HFOV (deg.) | 23.0 | Y11/Y62 | 0.60 |
| V4 | 21.4 | SAG62 + CT6 (mm) | −0.35 |
| Nmax | 1.650 | (ΣCT+ ΣAT)/SD | 1.08 |
| CT6/T12 | 5.79 | (ΣCT + ΣAT)/ΣCT | 1.81 |
| T56/CTmax | 1.41 | TL/f | 1.03 |
| f/R1 | 3.14 | TL/ImgH | 2.38 |

7th Embodiment

Figure 13:
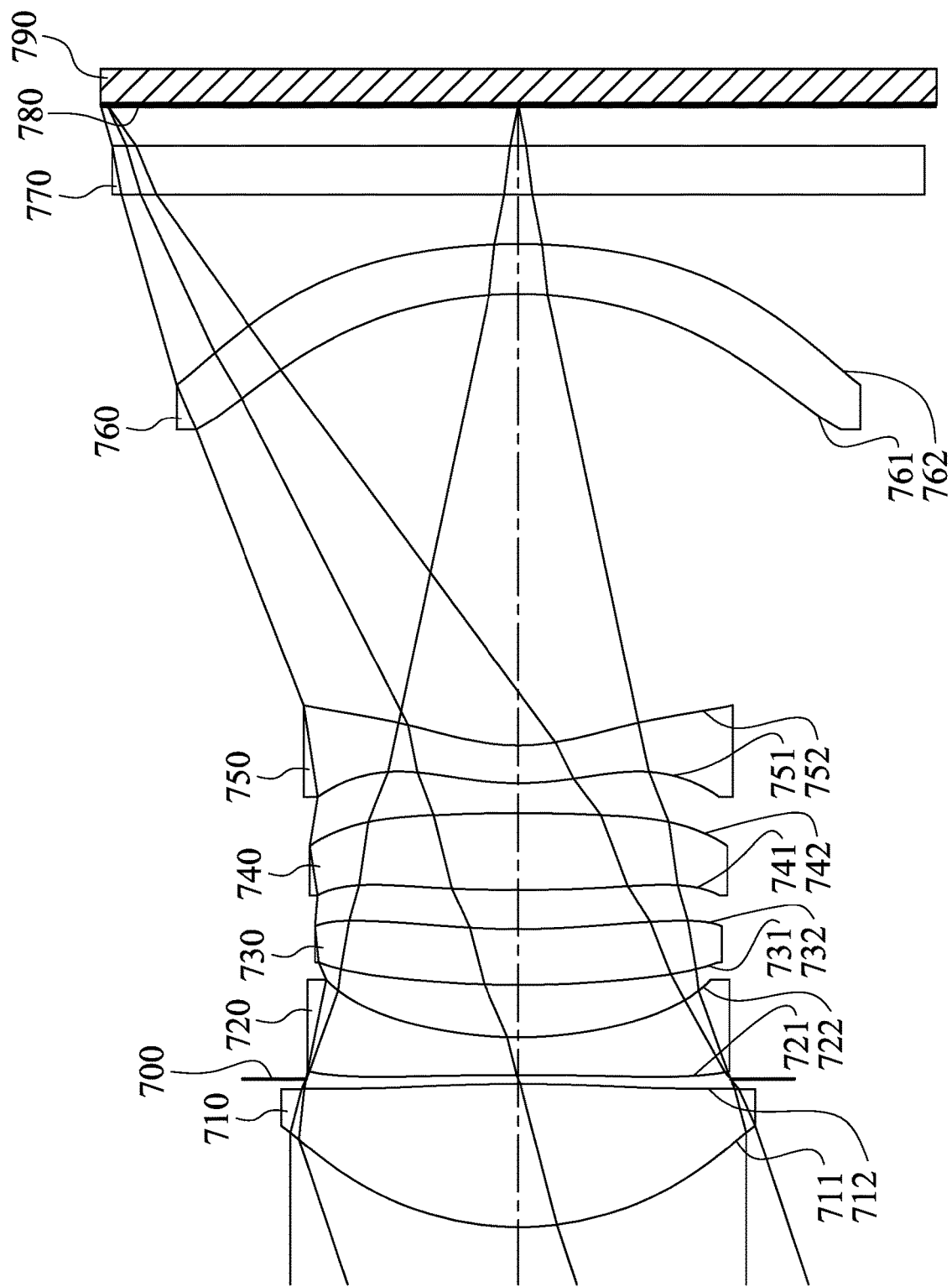
FIG. 13 is a schematic view of an imaging apparatus according to the 7th embodiment of the present disclosure.
Figure 14:
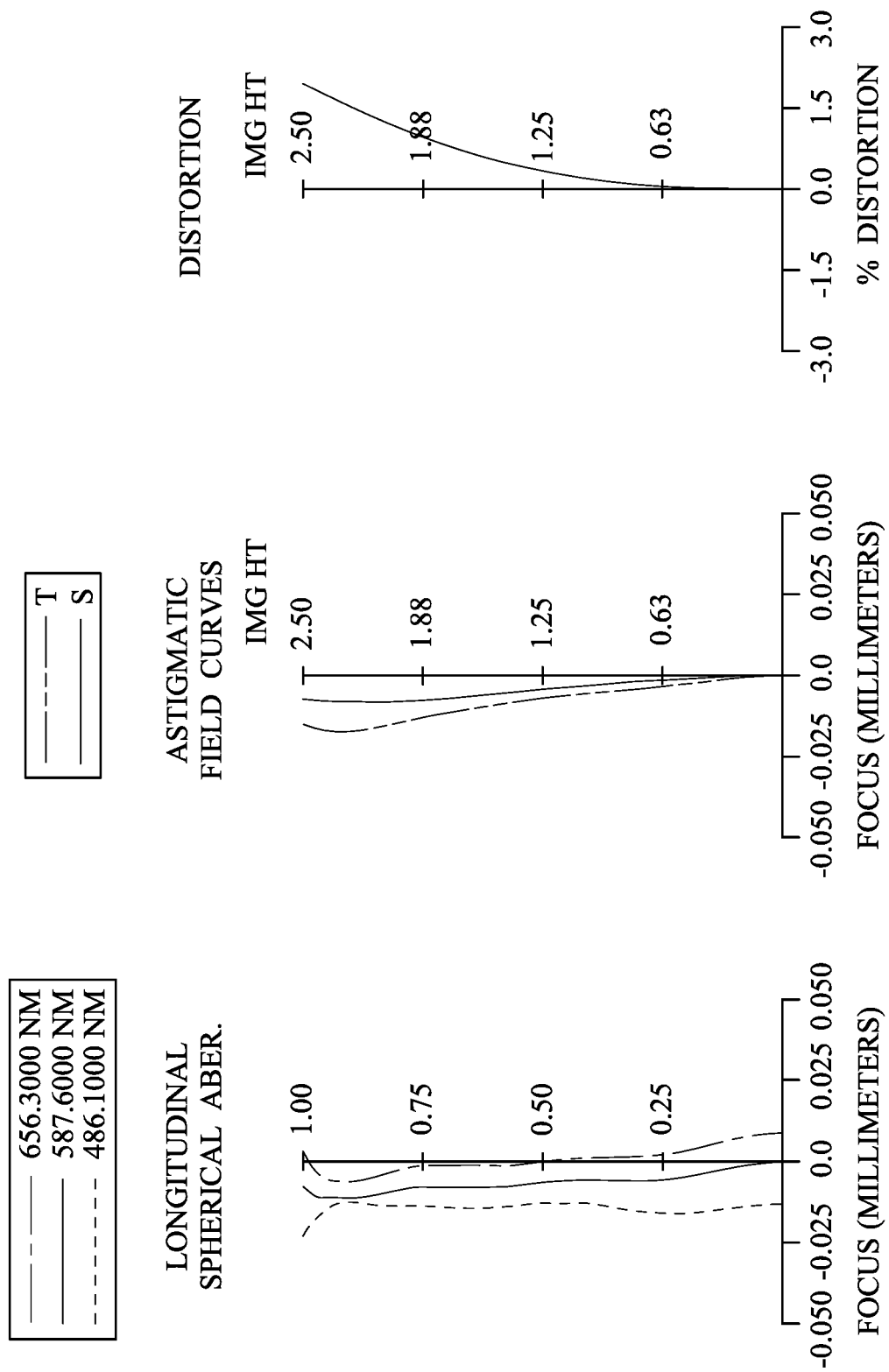
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows, in order from left to right, spherical aberration curves, astigmatic field curves and a distortion curve of the imaging apparatus according to the 7th embodiment.

In FIG. 13, the imaging apparatus includes the imaging optical lens assembly (its reference numeral is omitted) and an image sensor 790. The imaging optical lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780. The image sensor 790 is disposed on the image surface 780 of the imaging optical lens assembly. The imaging optical lens assembly has a total of six lens elements (710-760) with refractive power. Moreover, there is an air gap between any two of the first lens element 710, the second lens element 720, the third lens element 730, the fourth lens element 740, the fifth lens element 750, and the sixth lens element 760 that are adjacent to each other and there is no relative movement among the lens elements (710-760) with refractive power.

The first lens element 710 with positive refractive power has a convex object-side surface 711 and a convex image-side surface 712. The first lens element 710 is made of plastic material and has both the object-side surface 711 and the image-side surface 712 being aspheric.

The second lens element 720 with negative refractive power has a concave object-side surface 721 and a concave image-side surface 722. The second lens element 720 is made of plastic material and has both the object-side surface 721 and the image-side surface 722 being aspheric.

The third lens element 730 with negative refractive power has a convex object-side surface 731 and a concave image-side surface 732. The third lens element 730 is made of plastic material and has both the object-side surface 731 and the image-side surface 732 being aspheric.

The fourth lens element 740 with positive refractive power has a convex object-side surface 741 and a convex image-side surface 742. The fourth lens element 740 is made of plastic material and has both the object-side surface 741 and the image-side surface 742 being aspheric.

The fifth lens element 750 with negative refractive power has a convex object-side surface 751 and a concave image-side surface 752. The fifth lens element 750 is made of plastic material and has both the object-side surface 751 and the image-side surface 752 being aspheric. Furthermore, both of the object-side surface 751 and the image-side surface 752 of the fifth lens element 750 have at least one inflection point. The object-side surface 751 of the fifth lens element 750 changes from a convex shape to a concave shape from a paraxial region thereof to an off-axis region thereof.

The sixth lens element 760 with negative refractive power has a concave object-side surface 761 and a convex image-side surface 762. The sixth lens element 760 is made of plastic material and has both the object-side surface 761 and the image-side surface 762 being aspheric. Furthermore, the object-side surface 761 of the sixth lens element 760 has at least one inflection point.

The IR-cut filter 770 is made of glass material and located between the sixth lens element 760 and the image surface 780, and will not affect the focal length of the imaging optical lens assembly.

Furthermore, in the imaging optical lens assembly of the imaging apparatus according to the 7th embodiment, when an Abbe number of the first lens element 710 is V1, an Abbe number of the second lens element 720 is V2, an Abbe number of the third lens element 730 is V3, an Abbe number of the fourth lens element 740 is V4, an Abbe number of the fifth lens element 750 is V5, and an Abbe number of the sixth lens element 760 is V6, two (V2=25.6 and V4=25.7) of V1, V2, V3, V4, V5 and V6 are smaller than 27.

In the imaging optical lens assembly of the imaging apparatus according to the 7th embodiment, when an axial distance between the first lens element 710 and the second lens element 720 is T12, an axial distance between the second lens element 720 and the third lens element 730 is T23, an axial distance between the third lens element 730 and the fourth lens element 740 is T34, an axial distance between the fourth lens element 740 and a fifth lens element 750 is T45, and the axial distance between the fifth lens element 750 and the sixth lens element 760 is T56, the following conditions are satisfied: 0<T12<T23<T56; 0<T12<T34<T56; 0<T45<T23<T56; and 0<T45<T34<T56.

The detailed optical data of the 7th embodiment are shown in TABLE 13 and the aspheric surface data are shown in TABLE 14 below.

TABLE 13

7th Embodiment
f = 7.34 mm, Fno = 2.65, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.894 | ASP | 0.872 | Plastic | 1.535 | 56.3 | 3.12 |

TABLE 13-continued

7th Embodiment
f = 7.34 mm, Fno = 2.65, HFOV = 18.5 deg.

| Surface # | | Curvature Radius | | Thickness | Material | Index | Abbe # | Focal Length |
|---|---|---|---|---|---|---|---|---|
| 2 | | −11.754 | ASP | 0.030 | | | | |
| 3 | Ape. Stop | Plano | | 0.024 | | | | |
| 4 | Lens 2 | −77.548 | ASP | 0.230 | Plastic | 1.614 | 25.6 | −3.92 |
| 5 | | 2.487 | ASP | 0.317 | | | | |
| 6 | Lens 3 | 5.500 | ASP | 0.340 | Plastic | 1.535 | 56.3 | −60.34 |
| 7 | | 4.597 | ASP | 0.241 | | | | |
| 8 | Lens 4 | 11.705 | ASP | 0.468 | Plastic | 1.608 | 25.7 | 8.25 |
| 9 | | −8.638 | ASP | 0.179 | | | | |
| 10 | Lens 5 | 1.714 | ASP | 0.230 | Plastic | 1.544 | 55.9 | −10.62 |
| 11 | | 1.259 | ASP | 2.748 | | | | |
| 12 | Lens 6 | −2.638 | ASP | 0.304 | Plastic | 1.535 | 56.3 | −15.40 |
| 13 | | −4.037 | ASP | 0.300 | | | | |
| 14 | IR-cut filter | Plano | | 0.300 | Glass | 1.517 | 64.2 | — |
| 15 | | Plano | | 0.248 | | | | |
| 16 | Image | Plano | | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k= | 1.3548E−01 | −1.0000E+00 | −5.0000E+01 | −4.7830E+00 | −1.0000E+00 | −1.4447E+01 |
| A4= | −1.3365E−03 | −1.5478E−02 | −6.7159E−02 | −7.5782E−03 | −4.3670E−02 | −4.3815E−02 |
| A6= | −7.3293E−03 | 5.0418E−02 | 1.2146E−01 | 7.4770E−02 | 2.9576E−02 | −1.9454E−02 |
| A8= | 1.1371E−02 | −9.7175E−03 | −6.3978E−02 | −4.2395E−02 | −2.9239E−03 | 2.3540E−02 |
| A10= | −1.1736E−02 | −2.2992E−02 | −1.8916E−03 | 1.1770E−02 | 5.8726E−03 | 2.3400E−03 |
| A12= | 6.1517E−03 | 1.5264E−02 | 1.3861E−02 | 3.9561E−03 | −1.3121E−03 | −6.7124E−03 |
| A14= | −1.5286E−03 | −2.9579E−03 | −3.2776E−03 | 7.1360E−04 | −5.4848E−04 | −5.8719E−04 |

| Surface # | 8 | 9 | 10 | 11 | 12 | 13 |
|---|---|---|---|---|---|---|
| k= | −3.4725E+01 | 2.0000E+01 | −5.0891E+00 | −3.9429E+00 | −5.6805E+00 | −3.3676E+00 |
| A4= | 6.9614E−02 | 5.5000E−02 | −2.3314E−02 | −1.6325E−01 | −5.1096E−02 | −3.5467E−02 |
| A6= | −1.3617E−01 | −9.3344E−02 | 3.0438E−02 | 5.0934E−02 | 1.1568E−02 | 5.9971E−03 |
| A8= | 8.6542E−02 | 2.5083E−02 | 4.7505E−04 | 1.4832E−02 | −2.2538E−03 | −1.7044E−03 |
| A10= | −4.7114E−02 | −2.5731E−03 | −1.3566E−03 | −7.2769E−03 | 2.8861E−05 | 3.7451E−04 |
| A12= | 1.8130E−02 | 2.8081E−03 | 9.2896E−03 | −8.1351E−04 | 1.3986E−04 | −4.8938E−05 |
| A14= | −4.6189E−03 | −1.3237E−03 | −4.6847E−03 | 4.9716E−04 | −1.6635E−05 | 5.0114E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 7.34 | f/ImgH | 2.94 |
| Fno | 2.65 | f2/f3456 | −0.29 |
| HFOV (deg.) | 18.5 | Y11/Y62 | 0.69 |
| V4 | 25.7 | SAG62 + CT6 (mm) | −0.55 |
| Nmax | 1.614 | (ΣCT + ΣAT)/SD | 1.18 |
| CT6/T12 | 5.63 | (ΣCT + ΣAT)/ΣCT | 2.45 |
| T56/CTmax | 3.15 | TL/f | 0.93 |
| f/R1 | 3.88 | TL/ImgH | 2.73 |

8th Embodiment

Figure 15:
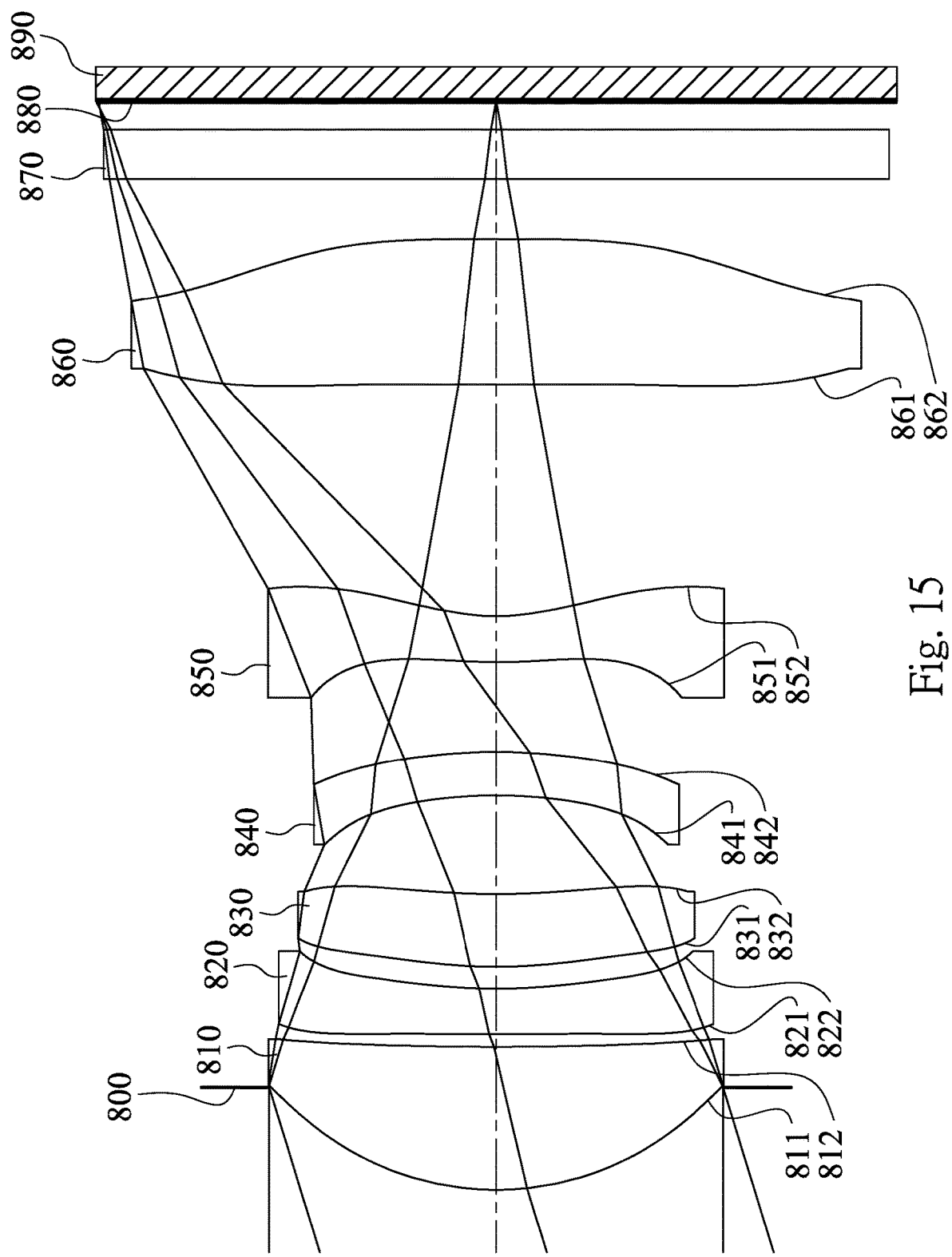
FIG. 15 is a schematic view of an imaging apparatus according to the 8th embodiment of the present disclosure.
Figure 16:
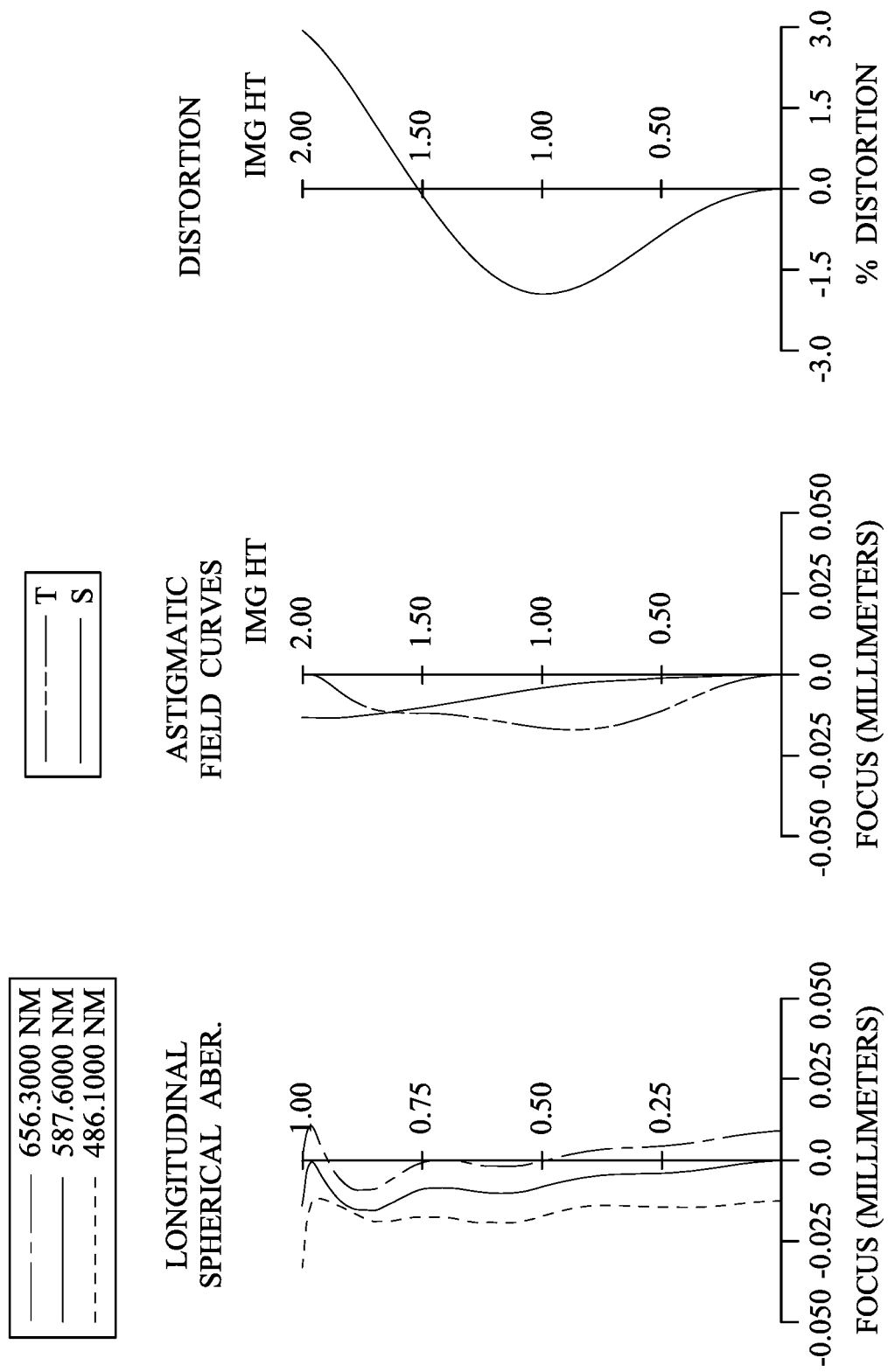
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows, in order from left to right, spherical aberration curves, astigmatic field curves and a distortion curve of the imaging apparatus according to the 8th embodiment.

In FIG. 15, the imaging apparatus includes the imaging optical lens assembly (its reference numeral is omitted) and an image sensor 890. The imaging optical lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880. The image sensor 890 is disposed on the image surface 880 of the imaging optical lens assembly. The imaging optical lens assembly has a total of six lens elements (810-860) with refractive power. Moreover, there is an air gap between any two of the first lens element 810, the second lens element 820, the third lens element 830, the fourth lens element 840, the fifth lens element 850, and the sixth lens element 860 that are adjacent to each other and there is no relative movement among the lens elements (810-860) with refractive power.

The first lens element 810 with positive refractive power has a convex object-side surface 811 and a concave image-side surface 812. The first lens element 810 is made of plastic material and has both the object-side surface 811 and the image-side surface 812 being aspheric.

The second lens element 820 with negative refractive power has a convex object-side surface 821 and a concave image-side surface 822. The second lens element 820 is made of plastic material and has both the object-side surface 821 and the image-side surface 822 being aspheric.

The third lens element 830 with positive refractive power has a convex object-side surface 831 and a concave image-side surface 832. The third lens element 830 is made of plastic material and has both the object-side surface 831 and the image-side surface 832 being aspheric.

The fourth lens element 840 with negative refractive power has a concave object-side surface 841 and a convex image-side surface 842. The fourth lens element 840 is made of plastic material and has both the object-side surface 841 and the image-side surface 842 being aspheric.

The fifth lens element 850 with negative refractive power has a convex object-side surface 851 and a concave image-side surface 852. The fifth lens element 850 is made of plastic material and has both the object-side surface 851 and the image-side surface 852 being aspheric. Furthermore, both of the object-side surface 851 and the image-side surface 852 of the fifth lens element 850 have at least one inflection point. The object-side surface 851 of the fifth lens element 850 changes from a convex shape to a concave shape from a paraxial region thereof to an off-axis region thereof.

The sixth lens element 860 with positive refractive power has a convex object-side surface 861 and a convex image-side surface 862. The sixth lens element 860 is made of plastic material and has both the object-side surface 861 and the image-side surface 862 being aspheric. Furthermore, the object-side surface 861 of the sixth lens element 860 has at least one inflection point.

The IR-cut filter 870 is made of glass material and located between the sixth lens element 860 and the image surface 880, and will not affect the focal length of the imaging optical lens assembly.

Furthermore, in the imaging optical lens assembly of the imaging apparatus according to the 8th embodiment, when an Abbe number of the first lens element 810 is V1, an Abbe number of the second lens element 820 is V2, an Abbe number of the third lens element 830 is V3, an Abbe number of the fourth lens element 840 is V4, an Abbe number of the fifth lens element 850 is V5, and an Abbe number of the sixth lens element 860 is V6, three (V2=23.3, V4=23.3 and V6=23.3) of V1, V2, V3, V4, V5 and V6 are smaller than 27.

The detailed optical data of the 8th embodiment are shown in TABLE 15 and the aspheric surface data are shown in TABLE 16 below.

TABLE 15

8th Embodiment
f = 6.37 mm, Fno = 2.80, HFOV = 17.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.514 | | | | |
| 2 | Lens 1 | 1.457 | ASP | 0.716 | Plastic | 1.544 | 55.9 | 2.96 |
| 3 | | 12.474 | ASP | 0.064 | | | | |
| 4 | Lens 2 | 14.903 | ASP | 0.230 | Plastic | 1.640 | 23.3 | −5.36 |
| 5 | | 2.770 | ASP | 0.110 | | | | |
| 6 | Lens 3 | 2.626 | ASP | 0.364 | Plastic | 1.544 | 55.9 | 12.88 |
| 7 | | 3.993 | ASP | 0.494 | | | | |
| 8 | Lens 4 | −2.426 | ASP | 0.220 | Plastic | 1.640 | 23.3 | −86.25 |
| 9 | | −2.627 | ASP | 0.450 | | | | |
| 10 | Lens 5 | 2.969 | ASP | 0.230 | Plastic | 1.544 | 55.9 | −3.52 |
| 11 | | 1.132 | ASP | 1.162 | | | | |
| 12 | Lens 6 | 31.423 | ASP | 0.732 | Plastic | 1.640 | 23.3 | 35.12 |
| 13 | | −78.128 | ASP | 0.300 | | | | |
| 14 | IR-cut filter | Plano | | 0.248 | Glass | 1.517 | 64.2 | — |
| 15 | | Plano | | 0.143 | | | | |
| 16 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k= | 1.9802E−01 | −1.0000E+00 | 5.0000E+01 | −1.9639E+01 | −1.0000E+00 | −2.1192E+00 |
| A4= | −8.0099E−03 | −7.6883E−02 | −1.7868E−01 | −8.8066E−02 | −1.3207E−01 | −4.9263E−02 |
| A6= | −1.6001E−02 | 1.4821E−01 | 3.5910E−01 | 2.1239E−01 | 3.5258E−02 | −1.1283E−01 |
| A8= | 4.4456E−02 | −4.6828E−02 | −2.9209E−01 | −1.8604E−01 | −1.1265E−02 | 6.4287E−02 |
| A10= | −8.9641E−02 | −1.6173E−01 | 2.2248E−03 | 8.4454E−02 | 6.8727E−02 | 5.4697E−03 |
| A12= | 7.8626E−02 | 1.9180E−01 | 1.6403E−01 | 4.8885E−02 | −2.3754E−02 | −5.2041E−02 |
| A14= | −2.9994E−02 | −6.3300E−02 | −6.7745E−02 | 7.2581E−03 | 2.0157E−02 | 1.8733E−02 |

TABLE 16-continued

Aspheric Coefficients

| Surface # | 8 | 9 | 10 | 11 | 12 | 13 |
|---|---|---|---|---|---|---|
| k= | 3.0982E+00 | 2.5114E−01 | −5.0000E+01 | −6.8815E+00 | −9.0000E+01 | −5.0000E+01 |
| A4= | 9.8721E−02 | 1.6646E−01 | −3.2465E−01 | −1.5612E−01 | −5.5455E−02 | −1.2931E−01 |
| A6= | −4.2039E−01 | −3.1764E−01 | 7.4450E−02 | 4.9819E−02 | 3.9917E−02 | 5.2352E−02 |
| A8= | 3.3086E−01 | 1.2945E−01 | −1.0440E−01 | 3.1516E−03 | −8.0167E−03 | −7.8884E−03 |
| A10= | −4.5116E−01 | −2.0511E−02 | −2.2109E−02 | −2.4433E−02 | −1.9292E−04 | 6.8734E−04 |
| A12= | 2.6965E−01 | 2.7247E−02 | 2.2105E−03 | 1.6808E−02 | 3.0708E−04 | −8.9048E−05 |
| A14= | 5.2062E−02 | 2.2749E−02 | −4.6883E−03 | −3.6805E−03 | −3.6479E−05 | 4.0997E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 6.37 | f/ImgH | 3.18 |
| Fno | 2.80 | f12/f3456 | −0.79 |
| HFOV (deg.) | 17.0 | Y11/Y62 | 0.62 |
| V4 | 23.3 | SAG62 + CT6 (mm) | 0.42 |
| Nmax | 1.640 | (ΣCT + ΣAT)/SD | 1.12 |
| CT6/T12 | 11.44 | (ΣCT + ΣAT)/ΣCT | 1.91 |
| T56/CTmax | 1.59 | TL/f | 0.86 |
| f/R1 | 4.37 | TL/ImgH | 2.73 |

9th Embodiment

Figure 17:
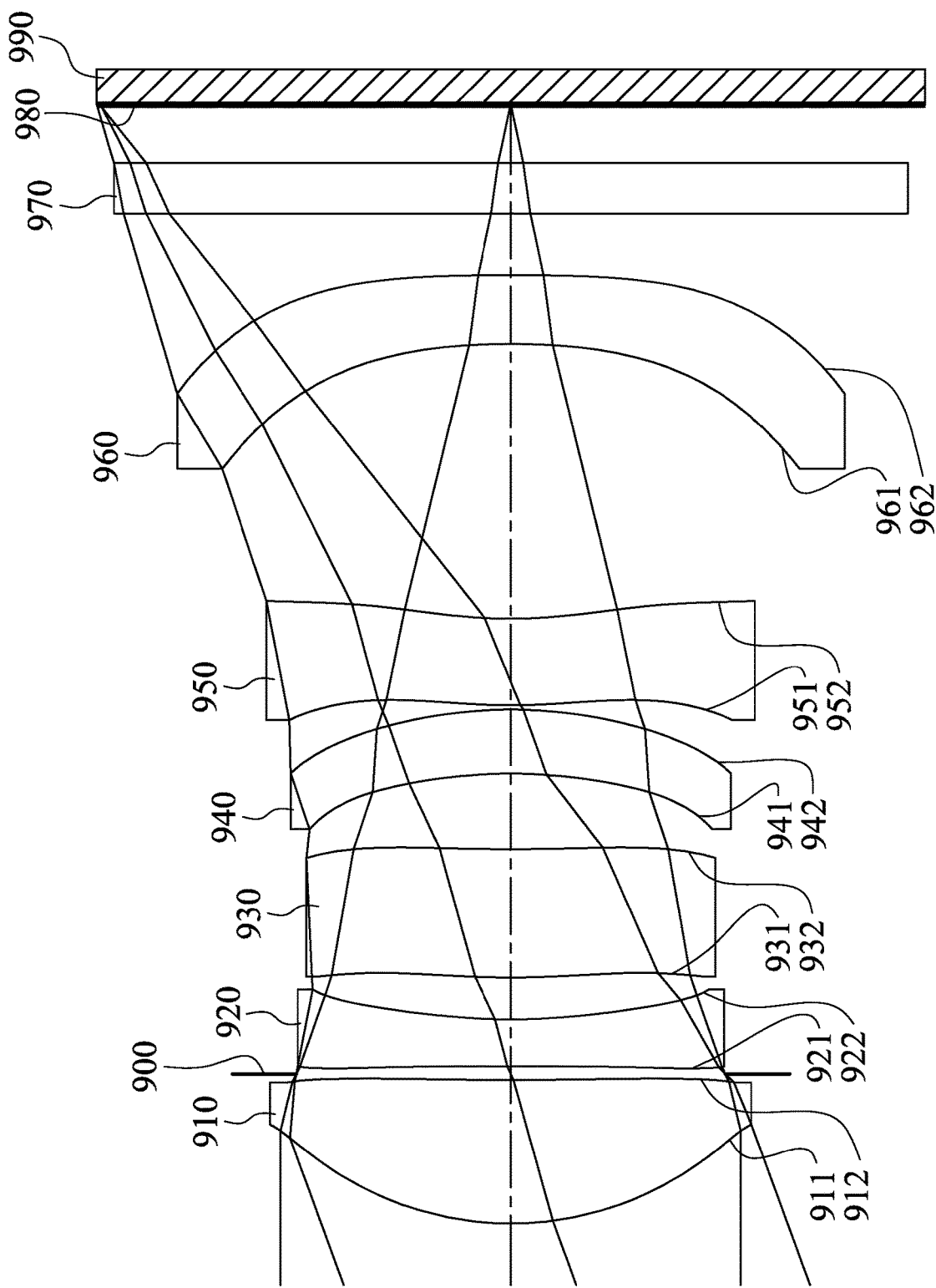
FIG. 17 is a schematic view of an imaging apparatus according to the 9th embodiment of the present disclosure.
Figure 18:
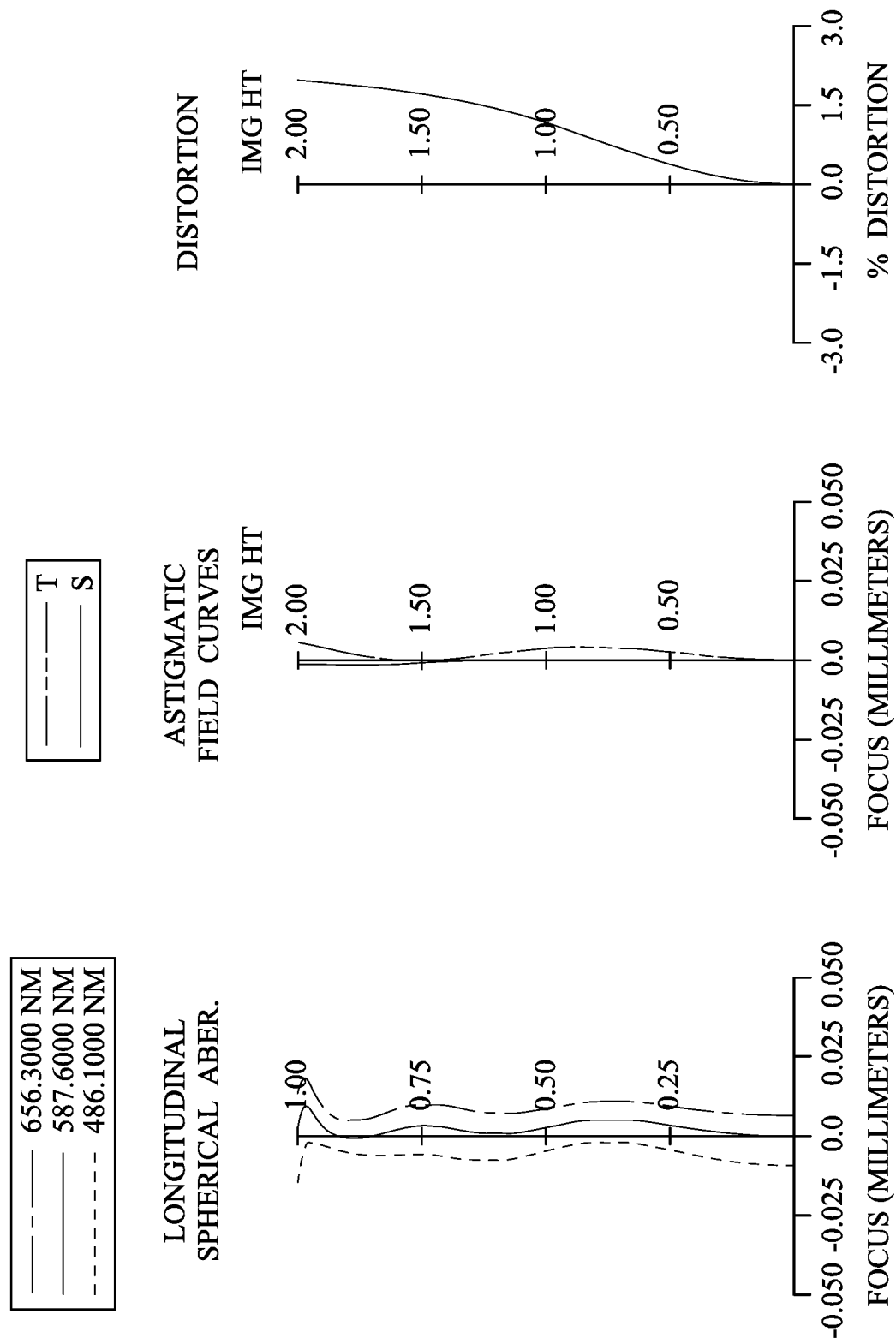
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows, in order from left to right, spherical aberration curves, astigmatic field curves and a distortion curve of the imaging apparatus according to the 9th embodiment.

In FIG. 17, the imaging apparatus includes the imaging optical lens assembly (its reference numeral is omitted) and an image sensor 990. The imaging optical lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 970 and an image surface 980. The image sensor 990 is disposed on the image surface 980 of the imaging optical lens assembly. The imaging optical lens assembly has a total of six lens elements (910-960) with refractive power. Moreover, there is an air gap between any two of the first lens element 910, the second lens element 920, the third lens element 930, the fourth lens element 940, the fifth lens element 950, and the sixth lens element 960 that are adjacent to each other and there is no relative movement among the lens elements (910-960) with refractive power.

The first lens element 910 with positive refractive power has a convex object-side surface 911 and a concave image-side surface 912. The first lens element 910 is made of plastic material and has both the object-side surface 911 and the image-side surface 912 being aspheric.

The second lens element 920 with negative refractive power has a convex object-side surface 921 and a concave image-side surface 922. The second lens element 920 is made of plastic material and has both the object-side surface 921 and the image-side surface 922 being aspheric.

The third lens element 930 with positive refractive power has a convex object-side surface 931 and a concave image-side surface 932. The third lens element 930 is made of plastic material and has both the object-side surface 931 and the image-side surface 932 being aspheric.

The fourth lens element 940 with positive refractive power has a concave object-side surface 941 and a convex image-side surface 942. The fourth lens element 940 is made of plastic material and has both the object-side surface 941 and the image-side surface 942 being aspheric.

The fifth lens element 950 with negative refractive power has a convex object-side surface 951 and a concave image-side surface 952. The fifth lens element 950 is made of plastic material and has both the object-side surface 951 and the image-side surface 952 being aspheric. Furthermore, both of the object-side surface 951 and the image-side surface 952 of the fifth lens element 950 have at least one inflection point. The object-side surface 951 of the fifth lens element 950 changes from a convex shape to a concave shape from a paraxial region thereof to an off-axis region thereof.

The sixth lens element 960 with negative refractive power has a concave object-side surface 961 and a convex image-side surface 962. The sixth lens element 960 is made of plastic material and has both the object-side surface 961 and the image-side surface 962 being aspheric.

The IR-cut filter 970 is made of glass material and located between the sixth lens element 960 and the image surface 980, and will not affect the focal length of the imaging optical lens assembly.

Furthermore, in the imaging optical lens assembly of the imaging apparatus according to the 9th embodiment, when an Abbe number of the first lens element 910 is V1, an Abbe number of the second lens element 920 is V2, an Abbe number of the third lens element 930 is V3, an Abbe number of the fourth lens element 940 is V4, an Abbe number of the fifth lens element 950 is V5, and an Abbe number of the sixth lens element 960 is V6, two (V2=23.3 and V4=23.3) of V1, V2, V3, V4, V5 and V6 are smaller than 27.

In the imaging optical lens assembly of the imaging apparatus according to the 9th embodiment, when an axial distance between the first lens element 910 and the second lens element 920 is T12, an axial distance between the second lens element 920 and the third lens element 930 is T23, an axial distance between the third lens element 930 and the fourth lens element 940 is T34, an axial distance between the fourth lens element 940 and a fifth lens element 950 is T45, and the axial distance between the fifth lens element 950 and the sixth lens element 960 is T56, the following conditions are satisfied: 0<T12<T23<T56; 0<T12<T34<T56; 0<T45<T23<T56; and 0<T45<T34<T56.

The detailed optical data of the 9th embodiment are shown in TABLE 17 and the aspheric surface data are shown in TABLE 18 below.

TABLE 17

9th Embodiment
f = 5.39 mm, Fno = 2.40, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.573 | ASP | 0.701 | Plastic | 1.544 | 55.9 | 3.18 |
| 2 | | 14.442 | ASP | 0.030 | | | | |
| 3 | Ape. Stop | Plano | | 0.035 | | | | |
| 4 | Lens 2 | 20.523 | ASP | 0.230 | Plastic | 1.640 | 23.3 | −5.10 |
| 5 | | 2.801 | ASP | 0.205 | | | | |
| 6 | Lens 3 | 4.656 | ASP | 0.627 | Plastic | 1.544 | 55.9 | 15.14 |
| 7 | | 10.200 | ASP | 0.369 | | | | |
| 8 | Lens 4 | −2.203 | ASP | 0.312 | Plastic | 1.640 | 23.3 | 26.29 |
| 9 | | −2.056 | ASP | 0.020 | | | | |
| 10 | Lens 5 | 3.015 | ASP | 0.423 | Plastic | 1.544 | 55.9 | −18.06 |
| 11 | | 2.193 | ASP | 1.342 | | | | |
| 12 | Lens 6 | −3.362 | ASP | 0.335 | Plastic | 1.544 | 55.9 | −8.36 |
| 13 | | −13.323 | ASP | 0.300 | | | | |
| 14 | IR-cut filter | Plano | | 0.248 | Glass | 1.517 | 64.2 | — |
| 15 | | Plano | | 0.284 | | | | |
| 16 | Image | Plano | | — | | | | |

Note:
Reference wavelength is 587.6 nm (d-line).

TABLE 18

Aspheric Coefficients

| Surface # | 1 | 2 | 4 | 5 | 6 | 7 |
|---|---|---|---|---|---|---|
| k= | 1.5938E−01 | −1.0000E+00 | 5.0000E+01 | −1.7368E+01 | −1.0000E+00 | −1.7905E+01 |
| A4= | −3.0064E−03 | −8.5161E−02 | −1.8340E−01 | −8.1730E−02 | −1.3796E−01 | −5.6314E−02 |
| A6= | −1.1847E−02 | 1.3785E−01 | 3.5461E−01 | 2.0355E−01 | 2.2564E−01 | −5.6031E−02 |
| A8= | 4.3493E−02 | −5.1007E−02 | −2.9619E−01 | −2.0253E−01 | −3.6063E−02 | 2.5376E−02 |
| A10= | −8.7587E−02 | −1.6474E−01 | −3.0832E−03 | 7.5013E−02 | 3.9396E−02 | 6.8390E−03 |
| A12= | 7.9586E−02 | 1.8818E−01 | 1.6181E−01 | 4.1353E−02 | −1.5963E−02 | −1.9731E−02 |
| A14= | −3.1141E−02 | −6.0328E−02 | −6.3255E−02 | 4.8036E−03 | 2.3924E−02 | 7.9007E−03 |

| Surface # | 8 | 9 | 10 | 11 | 12 | 13 |
|---|---|---|---|---|---|---|
| k= | −5.7047E−02 | 2.2861E−01 | −2.9176E+01 | −1.6780E+01 | −2.1700E+00 | 4.7066E+01 |
| A4= | 2.0650E−01 | 1.2002E−01 | −2.0159E−01 | −9.6619E−02 | −8.6852E−02 | −6.9360E−02 |
| A6= | −4.3862E−01 | −1.7839E−01 | 7.2189E−02 | 1.5125E−02 | 7.0946E−03 | 6.9570E−03 |
| A8= | 4.4203E−01 | 1.3955E−01 | −3.5580E−02 | 2.5022E−02 | −5.4877E−03 | −2.7817E−03 |
| A10= | −3.7871E−01 | −9.1401E−02 | 2.6949E−02 | −1.5739E−02 | 2.8245E−04 | 4.0376E−04 |
| A12= | 1.2956E−01 | 2.1203E−02 | −1.7776E−03 | 6.5065E−03 | 4.5206E−04 | 6.1874E−05 |
| A14= | −1.6345E−02 | 4.2147E−04 | −8.0824E−03 | −1.4646E−03 | 4.2584E−05 | −3.0979E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 5.39 | f/ImgH | 2.69 |
| Fno | 2.40 | f12/f3456 | −0.30 |
| HFOV (deg.) | 20.0 | Y11/Y62 | 0.72 |

-continued

| 9th Embodiment | | | |
|---|---|---|---|
| V4 | 23.3 | SAG62 + CT6 (mm) | −0.24 |
| Nmax | 1.640 | (ΣCT + ΣAT)/SD | 1.19 |
| CT6/T12 | 5.15 | (ΣCT + ΣAT)/ΣCT | 1.76 |
| T56/CTmax | 1.91 | TL/f | 1.01 |
| f/R1 | 3.42 | TL/ImgH | 2.73 |

10th Embodiment

Figure 19:
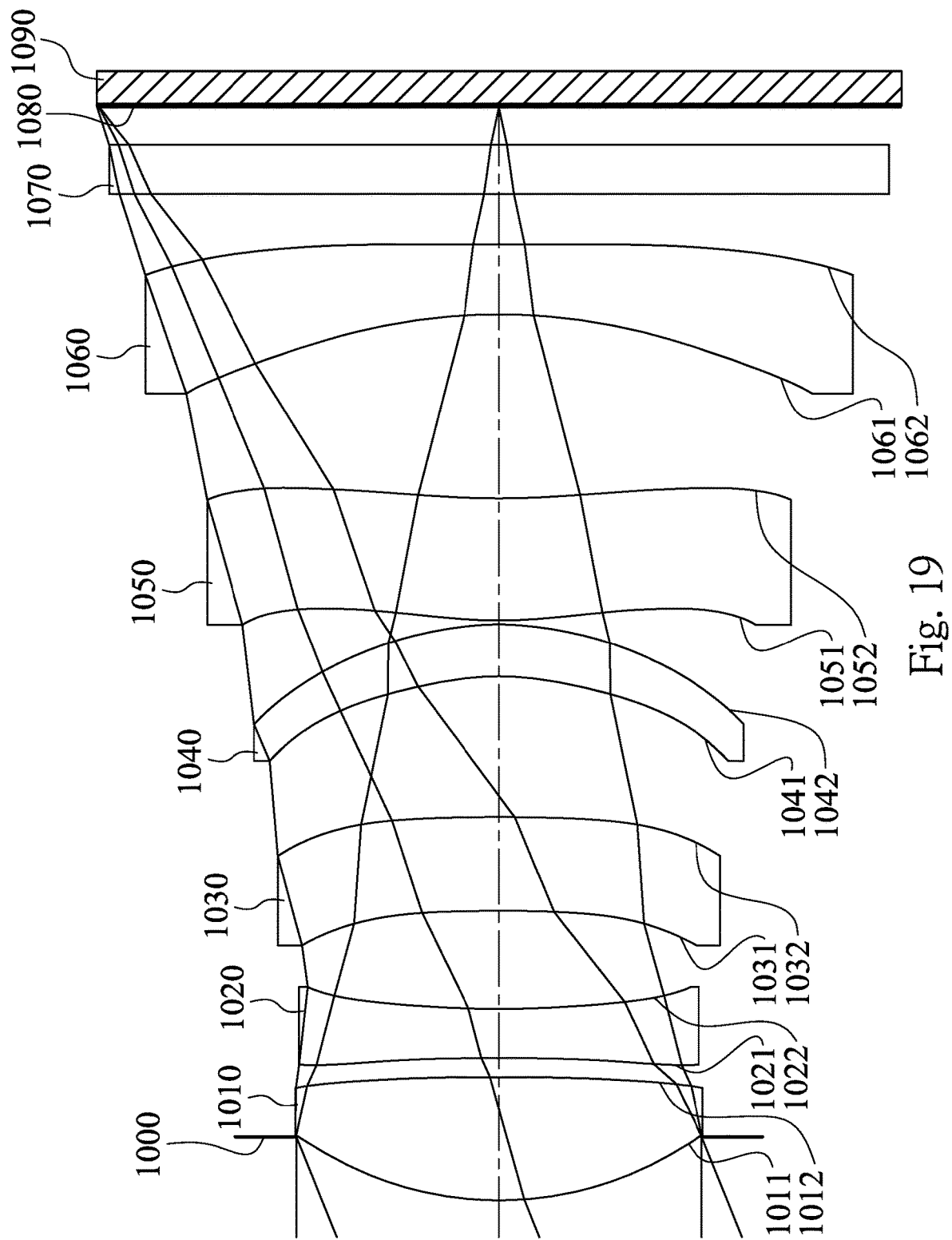
FIG. 19 is a schematic view of an imaging apparatus according to the 10th embodiment of the present disclosure.
Figure 20:
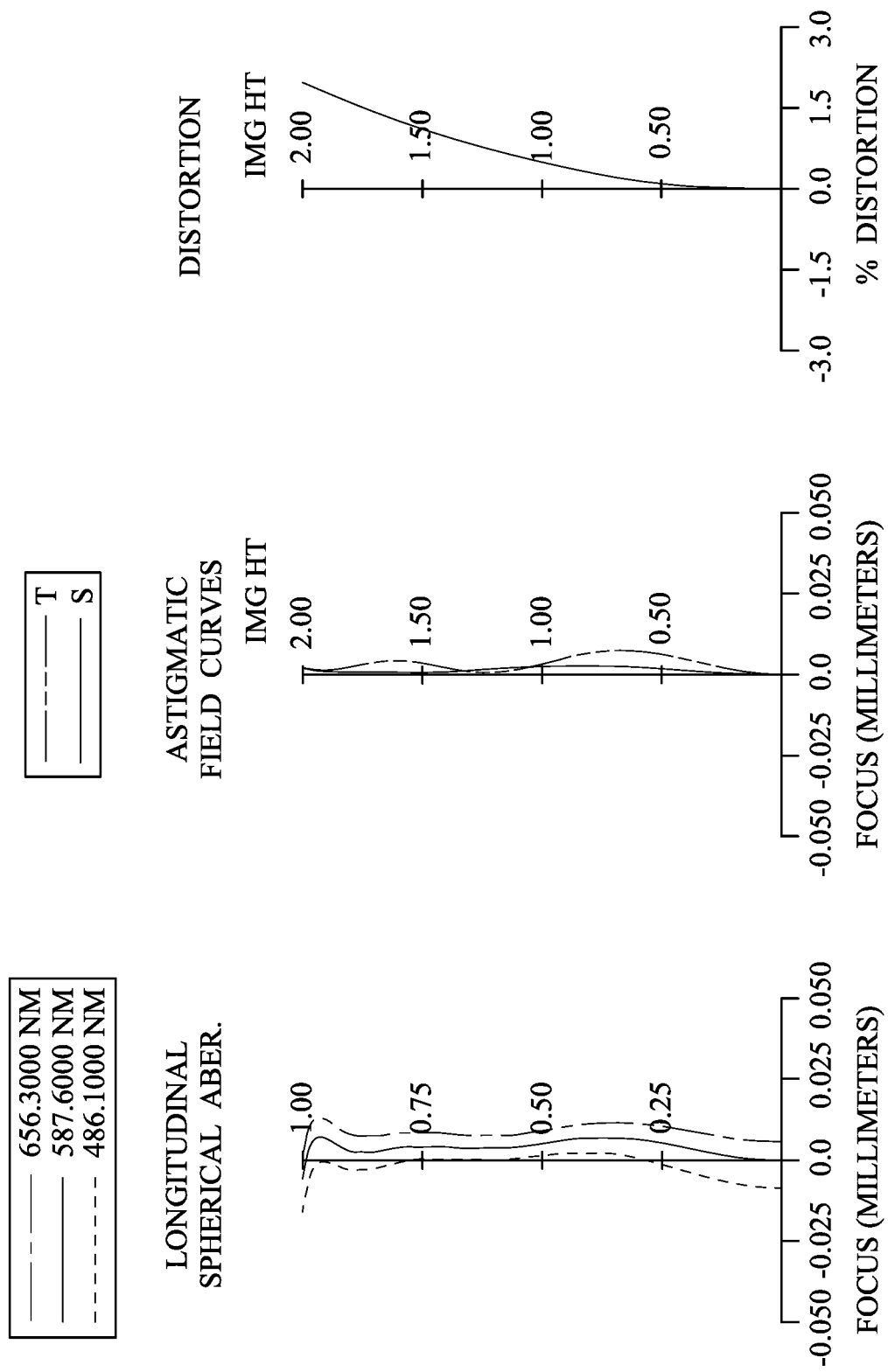
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows, in order from left to right, spherical aberration curves, astigmatic field curves and a distortion curve of the imaging apparatus according to the 10th embodiment.

In FIG. 19, the imaging apparatus includes the imaging optical lens assembly (its reference numeral is omitted) and an image sensor 1090. The imaging optical lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1070 and an image surface 1080. The image sensor 1090 is disposed on the image surface 1080 of the imaging optical lens assembly. The imaging optical lens assembly has a total of six lens elements (1010-1060) with refractive power. Moreover, there is an air gap between any two of the first lens element 1010, the second lens element 1020, the third lens element 1030, the fourth lens element 1040, the fifth lens element 1050, and the sixth lens element 1060 that are adjacent to each other and there is no relative movement among the lens elements (1010-1060) with refractive power.

The first lens element 1010 with positive refractive power has a convex object-side surface 1011 and a convex image-side surface 1012. The first lens element 1010 is made of plastic material and has both the object-side surface 1011 and the image-side surface 1012 being aspheric.

The second lens element 1020 with negative refractive power has a concave object-side surface 1021 and a concave image-side surface 1022. The second lens element 1020 is made of plastic material and has both the object-side surface 1021 and the image-side surface 1022 being aspheric.

The third lens element 1030 with negative refractive power has a concave object-side surface 1031 and a convex image-side surface 1032. The third lens element 1030 is made of plastic material and has both the object-side surface 1031 and the image-side surface 1032 being aspheric.

The fourth lens element 1040 with positive refractive power has a concave object-side surface 1041 and a convex image-side surface 1042. The fourth lens element 1040 is made of plastic material and has both the object-side surface 1041 and the image-side surface 1042 being aspheric.

The fifth lens element 1050 with positive refractive power has a convex object-side surface 1051 and a concave image-side surface 1052. The fifth lens element 1050 is made of plastic material and has both the object-side surface 1051 and the image-side surface 1052 being aspheric. Furthermore, both of the object-side surface 1051 and the image-side surface 1052 of the fifth lens element 1050 have at least one inflection point. The object-side surface 1051 of the fifth lens element 1050 changes from a convex shape to a concave shape from a paraxial region thereof to an off-axis region thereof.

The sixth lens element 1060 with negative refractive power has a concave object-side surface 1061 and a concave image-side surface 1062. The sixth lens element 1060 is made of plastic material and has both the object-side surface 1061 and the image-side surface 1062 being aspheric. Furthermore, the image-side surface 1062 of the sixth lens element 1060 has at least one inflection point.

The IR-cut filter 1070 is made of glass material and located between the sixth lens element 1060 and the image surface 1080, and will not affect the focal length of the imaging optical lens assembly.

Furthermore, in the imaging optical lens assembly of the imaging apparatus according to the 10th embodiment, when an Abbe number of the first lens element 1010 is V1, an Abbe number of the second lens element 1020 is V2, an Abbe number of the third lens element 1030 is V3, the Abbe number of the fourth lens element 1040 is V4, an Abbe number of the fifth lens element 1050 is V5, and an Abbe number of the sixth lens element 1060 is V6, three (V2=23.3, V4=23.3 and V6=23.3) of V1, V2, V3, V4, V5 and V6 are smaller than 27.

In the imaging optical lens assembly of the imaging apparatus according to the 10th embodiment, when an axial distance between the first lens element 1010 and the second lens element 1020 is T12, an axial distance between the second lens element 1020 and the third lens element 1030 is T23, an axial distance between the third lens element 1030 and the fourth lens element 1040 is T34, an axial distance between the fourth lens element 1040 and a fifth lens element 1050 is T45, and the axial distance between the fifth lens element 1050 and the sixth lens element 1060 is T56, the following conditions are satisfied: 0<T12<T23<T56; 0<T12<T34<T56; 0<T45<T23<T56; and 0<T45<T34<T56.

The detailed optical data of the 10th embodiment are shown in TABLE 19 and the aspheric surface data are shown in TABLE 20 below.

TABLE 19

10th Embodiment
f = 4.85 mm, Fno = 2.40, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.316 | | | | |
| 2 | Lens 1 | 1.741 | ASP | 0.616 | Plastic | 1.544 | 55.9 | 2.99 |
| 3 | | −22.152 | ASP | 0.094 | | | | |
| 4 | Lens 2 | −30.338 | ASP | 0.245 | Plastic | 1.640 | 23.3 | −6.25 |
| 5 | | 4.620 | ASP | 0.489 | | | | |
| 6 | Lens 3 | −9.153 | ASP | 0.470 | Plastic | 1.544 | 55.9 | −89.68 |
| 7 | | −11.470 | ASP | 0.701 | | | | |
| 8 | Lens 4 | −1.429 | ASP | 0.261 | Plastic | 1.640 | 23.3 | 134.16 |
| 9 | | −1.506 | ASP | 0.020 | | | | |
| 10 | Lens 5 | 2.507 | ASP | 0.608 | Plastic | 1.544 | 55.9 | 10.39 |
| 11 | | 4.119 | ASP | 0.919 | | | | |
| 12 | Lens 6 | −2.966 | ASP | 0.349 | Plastic | 1.640 | 23.3 | −4.30 |
| 13 | | 40.023 | ASP | 0.250 | | | | |
| 14 | IR-cut filter | Plano | | 0.248 | Glass | 1.517 | 64.2 | — |
| 15 | | Plano | | 0.196 | | | | |
| 16 | Image | Plano | | — | | | | |

Note:
Reference wavelength is 587.6 nm (d-line).

TABLE 20

Aspheric Coefficients

| Surface # | 2 | 3 | 4 | 5 | 6 | 7 |
|---|---|---|---|---|---|---|
| k= | 1.9874E−01 | −1.0000E+00 | −5.0000E+01 | −3.0729E+01 | −1.0000E+00 | −2.6703E+01 |
| A4= | 1.6992E−03 | −8.6921E−02 | −1.8580E−01 | −8.2305E−02 | −1.1346E−01 | −5.7516E−02 |
| A6= | −8.6575E−03 | 1.4011E−01 | 3.6387E−01 | 2.2441E−01 | −2.4580E−02 | −4.6890E−02 |
| A8= | 3.9198E−02 | −4.3001E−02 | −2.8759E−01 | −1.8975E−01 | −3.7457E−03 | 9.3117E−03 |
| A10= | −8.4097E−02 | −1.5868E−01 | 5.5728E−03 | 6.8894E−02 | 3.7163E−02 | 3.1640E−03 |
| A12= | 8.1967E−02 | 1.9121E−01 | 1.6116E−01 | 3.7131E−02 | −7.5224E−02 | −4.5081E−03 |
| A14= | −3.6456E−02 | −7.1793E−02 | −7.3135E−02 | −6.0985E−03 | 5.3857E−02 | 3.0069E−03 |

| Surface # | 8 | 9 | 10 | 11 | 12 | 13 |
|---|---|---|---|---|---|---|
| k= | −2.9843E+00 | −1.8604E−01 | −1.1315E+01 | −3.5618E+01 | −1.2753E+01 | 5.0000E+01 |
| A4= | 2.4193E−01 | 1.4465E−01 | −1.6690E−01 | −4.7542E−02 | −5.9500E−02 | −3.5320E−02 |
| A6= | −4.8839E−01 | −1.6127E−01 | 1.1230E−01 | −2.4636E−03 | 2.5898E−02 | 9.7534E−03 |
| A8= | 4.7021E−01 | 1.3110E−01 | −5.1886E−02 | 2.8646E−02 | −2.4445E−03 | −1.9535E−03 |
| A10= | −3.3811E−01 | −8.3386E−02 | 1.1427E−02 | −1.9560E−02 | −3.5334E−04 | 3.1454E−04 |
| A12= | 1.3801E−01 | 3.1585E−02 | −1.8534E−03 | 4.4047E−03 | −9.1457E−05 | −7.1451E−05 |
| A14= | −2.2905E−02 | −4.7021E−03 | −5.0751E−04 | −3.4496E−04 | −1.9867E−05 | 4.4475E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f (mm) | 4.85 | f/ImgH | 2.43 |
| Fno | 2.40 | f12/f3456 | −0.53 |
| HFOV (deg.) | 22.0 | Y11/Y62 | 0.58 |
| V4 | 23.3 | SAG62 + CT6 (mm) | 0.20 |
| Nmax | 1.640 | (ΣGT + ΣAT)/SD | 1.07 |
| CT6/T12 | 3.71 | (ΣCT + ΣAT)/ΣCT | 1.87 |
| T56/CTmax | 1.49 | TL/f | 1.13 |
| f/R1 | 2.79 | TL/ImgH | 2.73 |

11th Embodiment

Figure 22:
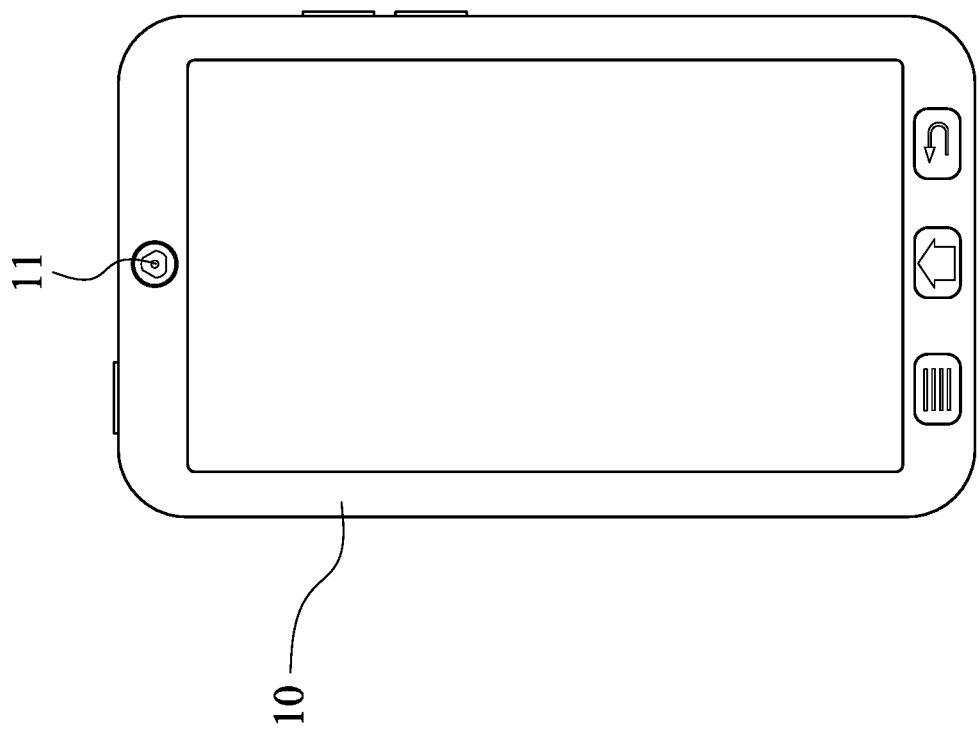
FIG. 22 shows an electronic device according to the 11th embodiment of the present disclosure.

FIG. 22 is a schematic view of an electronic device 10 according to the 11th embodiment of the present disclosure. The electronic device 10 of the 11th embodiment is a smart phone, wherein the electronic device 10 includes an imaging apparatus 11. The imaging apparatus 11 includes an imaging optical lens assembly (its reference numeral is omitted) according to the present disclosure and an image sensor (its reference numeral is omitted), wherein the image sensor is disposed on an image surface of the imaging optical lens assembly.

12th Embodiment

Figure 23:
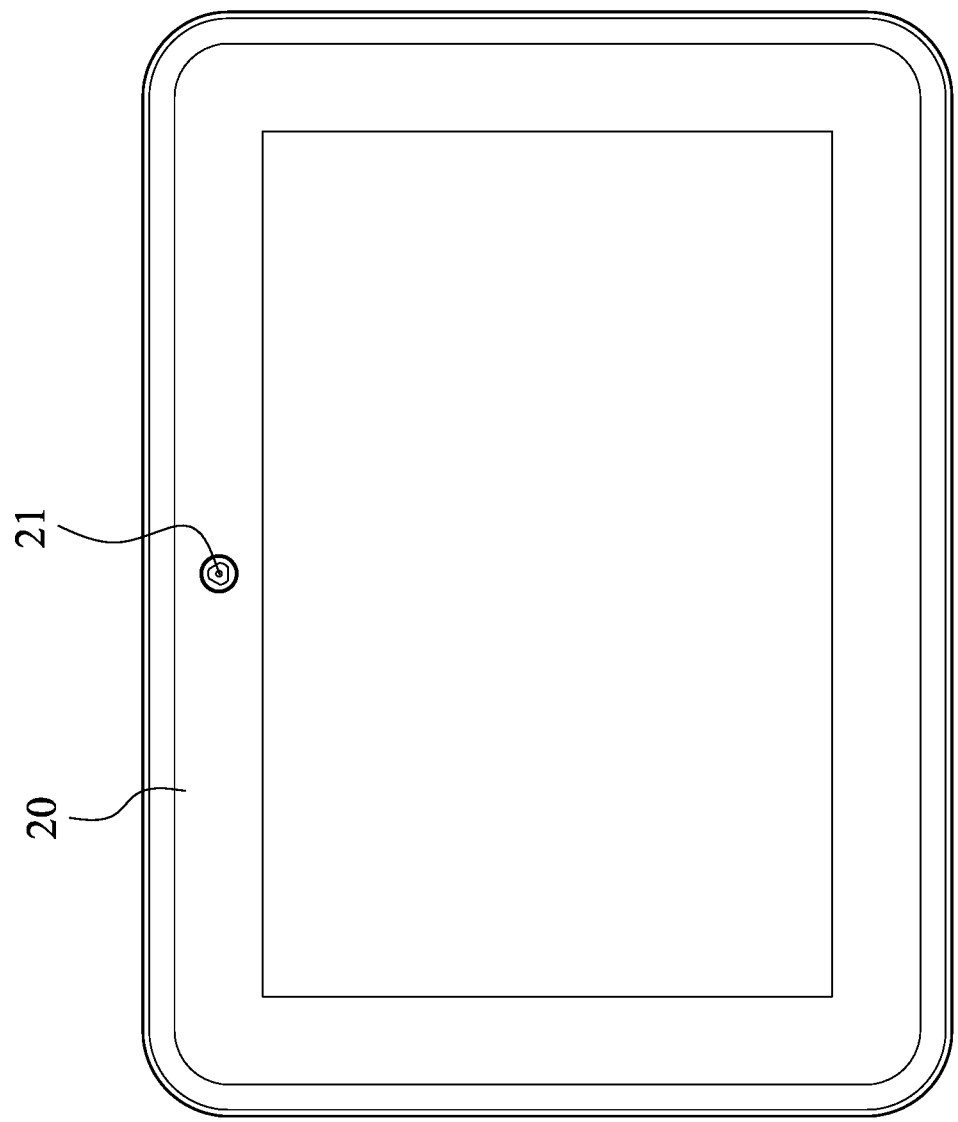
FIG. 23 shows an electronic device according to the 12th embodiment of the present disclosure.

FIG. 23 is a schematic view of an electronic device 20 according to the 12th embodiment of the present disclosure. The electronic device 20 of the 12th embodiment is a tablet personal computer, wherein the electronic device 20 includes an imaging apparatus 21. The imaging apparatus 21 includes an imaging optical lens assembly (its reference numeral is omitted) according to the present disclosure and an image sensor (its reference numeral is omitted), wherein the image sensor is disposed on an image surface of the imaging optical lens assembly.

13th Embodiment

Figure 24:
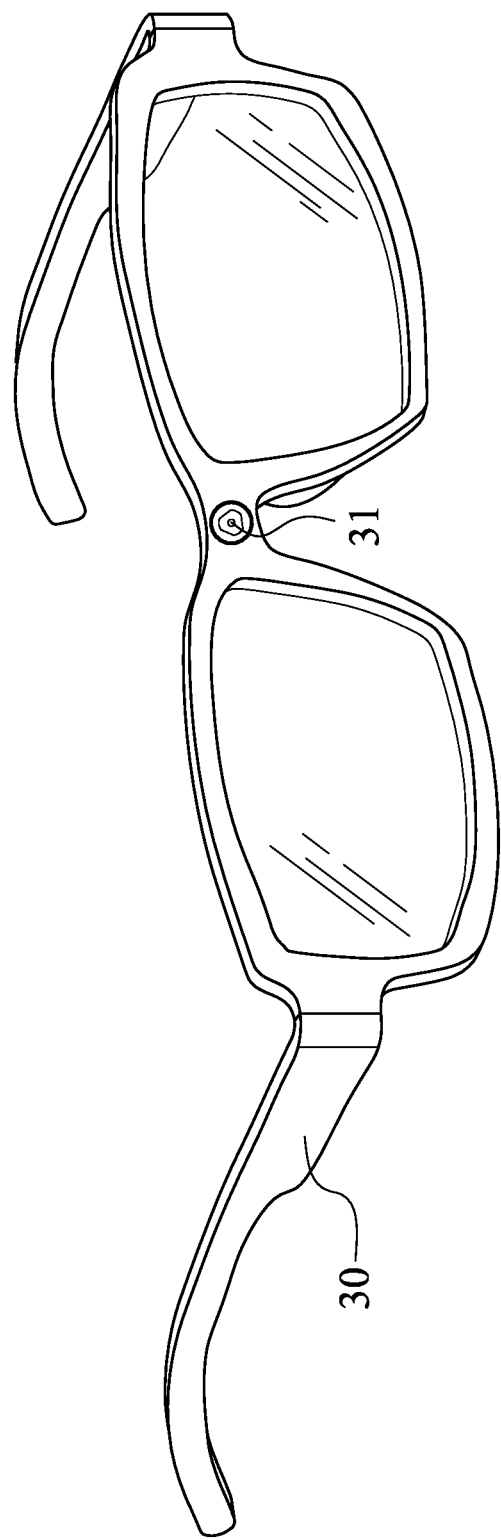
FIG. 24 shows an electronic device according to the 13th embodiment of the present disclosure.

FIG. 24 is a schematic view of an electronic device 30 according to the 13th embodiment of the present disclosure. The electronic device 30 of the 13th embodiment is a head-mounted display, wherein the electronic device 30 includes an imaging apparatus 31. The imaging apparatus 31 includes an imaging optical lens assembly (its reference numeral is omitted) according to the present disclosure and an image sensor (its reference numeral is omitted), wherein the image sensor is disposed on an image surface of the imaging optical lens assembly.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side:
   a first lens element, a second lens element, a third lens element, a fourth lens element, a fifth lens elements and a sixth lens element;
   wherein each of the six lens elements has an object-side surface facing towards the object side and an image-side surface facing towards the image side;
   wherein the fifth lens element has negative refractive power, at least one of the fifth lens element and the sixth lens element has at least one inflection point;
   wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and at least two of V1, V2, V3, V4, V5 and V6 are smaller than 27;

wherein an axial distance between the object-side surface of the first lens element and an image surface is TL, a focal length of the imaging optical lens assembly is f, a half of a maximal field of view of the imaging optical lens assembly is HFOV, and the following conditions are satisfied:

$0.70<TL/f<1.05$; and $7.5$ degrees$<$HFOV$<23.5$ degrees.

2. The imaging optical lens assembly of claim 1, wherein the half of a maximal field of view of the imaging optical lens assembly is HFOV, and the following condition is satisfied:

$7.5$ degrees$<$HFOV$\leq 20.0$ degrees.

3. The imaging optical lens assembly of claim 2, wherein the first lens element with positive refractive power has the object-side surface being convex in a paraxial region thereof, the focal length of the imaging optical lens assembly is f, a curvature radius of the object-side surface of the first lens element is R1, and the following condition is satisfied:

$3.0<f/R1$.

4. The imaging optical lens assembly of claim 2, wherein the second lens element has the object-side surface being convex in a paraxial region thereof, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum value among N1, N2, N3, N4, N5 and N6 is Nmax, and the following condition is satisfied:

$N\max<1.70$.

5. The imaging optical lens assembly of claim 1, wherein the half of a maximal field of view of the imaging optical lens assembly is HFOV, and the following condition is satisfied:

$7.5$ degrees$<$HFOV$\leq 18.5$ degrees.

6. The imaging optical lens assembly of claim 1, wherein the second lens element with negative refractive power has the image-side surface being concave in a paraxial region thereof, at least four of the six lens elements are made of plastic material.

7. The imaging optical lens assembly of claim 6, wherein the third lens element has the object-side surface being convex in a paraxial region thereof and the image-side surface being concave in a paraxial region thereof.

8. The imaging optical lens assembly of claim 6, wherein there is no relative movement among the six lens elements, there is an air gap between each of adjacent lens elements of the six lens elements, the focal length of the imaging optical lens assembly is f, a maximum image height of the imaging optical lens assembly is ImgH, and the following condition is satisfied:

$2.0<f/$ImgH.

9. The imaging optical lens assembly of claim 1, wherein the axial distance between the object-side surface of the first lens element and the image surface is TL, a maximum image height of the imaging optical lens assembly is ImgH, a sum of central thicknesses of the six lens elements is $\Sigma CT$, a sum of all axial distances between adjacent lens elements of the six lens elements is $\Sigma AT$, the imaging optical lens assembly further comprises an aperture stop, an axial distance between the aperture stop and the image-side surface of the sixth lens element is SD, and the following conditions are satisfied:

$0.90<(\Sigma CT+\Sigma AT)/SD<1.20$; and $2.0<TL/$ImgH$<3.0$.

10. The imaging optical lens assembly of claim 1, wherein the fifth lens element has the image-side surface being concave in a paraxial region thereof.

11. The imaging optical lens assembly of claim 1, wherein the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, and at least two of V1, V2, V3, V4, V5 and V6 are equal to or smaller than 23.3.

12. The imaging optical lens assembly of claim 1, wherein the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, and at least two of V1, V2, V3, V4, V5 and V6 are equal to or smaller than 21.4.

13. The imaging optical lens assembly of claim 1, wherein an axial distance between the fifth lens element and the sixth lens element is a maximum among axial distances between adjacent lens elements of the six lens elements.

14. An imaging optical lens assembly comprising six lens elements, the six lens element being, in order from an object side to an image side:

a first lens element, a second lens element, a third element, a fourth lens element, a fifth lens element and a sixth lens element;

wherein each of the six lens elements has an object-side surface facing towards the object side and an image-side surface facing towards the image side;

wherein the second lens element has negative refractive power, the sixth lens element has positive refractive power, at least one of the fifth lens element and the sixth lens element has at least one inflection point;

wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and at least two of V1, V2, V3, V4, V5, and V6 are smaller than 27;

wherein an axial distance between the object-side surface of the first lens element and an image surface is TL, a focal length of the imaging optical lens assembly is f, and the following condition is satisfied:

$0.70<TL/f<1.05$.

15. The imaging optical lens assembly of claim 14, wherein the first lens element with positive refractive power has the object-side surface being convex in a paraxial region thereof, the second lens element has the image-side surface being concave in a paraxial region thereof, the focal length of the imaging optical lens assembly is f, a curvature radius of the object-side surface of the first lens element is R1, and the following condition is satisfied:

$3.0<f/R1$.

16. The imaging optical lens assembly of claim 14, wherein the fourth lens element has negative refractive power, the axial distance between the object-side surface of the first lens element and the image surface is TL, the focal length of the imaging optical lens assembly is f, and the following condition is satisfied:

0.70<*TL*/f<1.0.

17. The imaging optical lens assembly of claim 14, wherein the fifth lens element has the image-side surface being concave in a paraxial region thereof.

18. The imaging optical lens assembly of claim 14, wherein the sixth lens element has the image-side surface being convex in a paraxial region thereof, there is an air gap between each of adjacent lens elements of the six lens elements.

19. The imaging optical lens assembly of claim 14, wherein the axial distance between the object-side surface of the first lens element and the image surface is TL, a maximum image height of the imaging optical lens assembly is ImgH, a half of a maximal field of view of the imaging optical lens assembly is HFOV, and the following conditions are satisfied:

2.0<*TL*/ImgH<3.0; and 7.5 degrees<HFOV<23.5 degrees.

20. An imaging optical lens assembly comprising six lens elements, the six lens elements being, in order from an object side to an image side:
 a first lens element, a second lens element, a third lens element, a fourth lens element, a fifth lens element and a sixth lens element;
 wherein each of the six lens elements has an object-side surface facing towards the object side and an image-side surface facing towards the image side;
 wherein at least one of the fifth lens element and the sixth lens element has at least one inflection point;
 wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and at least two of V1, V2, V3, V4, V5 and V6 are equal to or smaller than 23.3;
 wherein an axial distance between the object-side surface of the first lens element and an image surface is TL, a focal length of the imaging optical lens assembly is f, a half of a maximal field of view of the imaging optical lens assembly is HFOV, and the following conditions are satisfied:

0.70<*TL*/f<1.05; and 7.5 degrees<HFOV<23.5 degrees.

21. The imaging optical lens assembly of claim 20, wherein the second lens element with negative refractive power has the image-side surface being concave in a paraxial region thereof.

22. The imaging optical lens assembly of claim 21, wherein the second lens element has the object-side surface being convex in a paraxial region thereof, the axial distance between the object-side surface of the first lens element and the image surface is TL, the focal length of the imaging optical lens assembly is f, and the following condition is satisfied:

0.70<*TL*/f<1.0.

23. The imaging optical lens assembly of claim 20, wherein the half of a maximal field of view of the imaging optical lens assembly is HFOV, and the following condition is satisfied:

7.5 degrees<HFOV≤20.0 degrees.

24. The imaging optical lens assembly of claim 23, wherein a maximum effective radius of the object-side surface of the first lens element is Y11, a maximum effective radius of the image-side surface of the sixth lens element is Y62, and the following condition is satisfied:

0.50<*Y*11/*Y*62<0.80.

25. The imaging optical lens assembly of claim 20, wherein the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, and at least two of V1, V2, V3, V4, V5 and V6 are equal to or smaller than 21.4.

26. The imaging optical lens assembly of claim 25, wherein the first lens element with positive refractive power has the object-side surface being convex in a paraxial region thereof, the focal length of the imaging optical lens assembly is f, a curvature radius of the object-side surface of the first lens element is R1, and the following condition is satisfied:

3.0<*f*/*R*1.

27. The imaging optical lens assembly of claim 20, wherein the sixth lens element has the image-side surface being convex in a paraxial region thereof, there is an air gap between each of adjacent lens elements of the six lens elements.

28. The imaging optical lens assembly of claim 20, wherein the fifth lens element has the image-side surface being concave in a paraxial region thereof, the axial distance between the object-side surface of the first lens element and the image surface is TL, a maximum image height of the imaging optical lens assembly is ImgH, and the following condition is satisfied:

2.0<*TL*/ImgH<3.0.

29. The imaging optical lens assembly of claim 20, wherein an axial distance between the fifth lens element and the sixth lens element is a maximum among axial distances between adjacent lens elements of the six lens elements.

30. The imaging optical lens assembly of claim 20, wherein a central thickness of the first lens element is a maximum of central thicknesses of the six lens elements.

31. An imaging apparatus, comprising:
 the imaging optical lens assembly of claim 20; and
 an image sensor disposed on the image surface of the imaging optical lens assembly.

32. An electronic device, comprising:
 the imaging apparatus of claim 31.

* * * * *